US012562529B2

(12) United States Patent
Wolf et al.

(10) Patent No.: US 12,562,529 B2
(45) Date of Patent: Feb. 24, 2026

(54) CHARGING CONNECTOR RELEASE MECHANISM

(71) Applicant: Rivian IP Holdings, LLC, Irvine, CA (US)

(72) Inventors: Philipp Josef Wolf, Dana Point, CA (US); Barry Lett, Chobham (GB); James John Alexander Dowle, Laguna Beach, CA (US); Raghav Jaswal, Coventry (GB); Charles Sanderson, Newport Beach, CA (US); Marcus Edward Merideth, Irvine, CA (US)

(73) Assignee: Rivian IP Holdings, LLC, Irvine, CA (US)

( * ) Notice: Subject to any disclaimer, the term of this patent is extended or adjusted under 35 U.S.C. 154(b) by 394 days.

(21) Appl. No.: 18/176,407

(22) Filed: Feb. 28, 2023

(65) Prior Publication Data

US 2024/0291202 A1 Aug. 29, 2024

(51) Int. Cl.
*H01R 13/633* (2006.01)
*H01R 13/627* (2006.01)

(52) U.S. Cl.
CPC ....... *H01R 13/633* (2013.01); *H01R 13/6272* (2013.01); *H01R 2201/26* (2013.01)

(58) Field of Classification Search
CPC .............. H01R 13/633; H01R 13/6272; H01R 2201/26; Y02T 90/14
USPC .......................................................... 439/352
See application file for complete search history.

(56) References Cited

U.S. PATENT DOCUMENTS 9,147,972 B2 * 9/2015 Ohmura ............... H01R 13/639
2011/0300733 A1 * 12/2011 Janarthanam ...... H01R 13/6392 439/304
2012/0098278 A1 * 4/2012 Proefke ................... B60L 53/16 292/144
2013/0089999 A1 * 4/2013 Martin ............... H01R 13/6395 439/345
2020/0398685 A1 * 12/2020 Motomiya .............. B60L 53/16
2021/0257781 A1 * 8/2021 Takagi ................. H01R 13/639
2023/0058392 A1 * 2/2023 Hitchcock .............. H01R 27/02

* cited by examiner

*Primary Examiner* — Tulsidas C Patel
*Assistant Examiner* — Jeffrey Mountain
(74) *Attorney, Agent, or Firm* — Patterson + Sheridan, LLP

(57) ABSTRACT

A charging port for an electric vehicle includes a charging socket, a push rod actuator, and a push rod coupled to the push rod actuator. The charging socket is configured to receive a charging connector of a charger (e.g., a charging station, a wall charger, a portable charger, etc.). The push rod is configured to decouple the charging connector from the charging socket when the push rod is displaced from a retracted position to an extended position by the push rod actuator.

18 Claims, 25 Drawing Sheets

CHARGING CONNECTOR RELEASE MECHANISM

INTRODUCTION

The present disclosure relates to electric vehicles (EVs). More particularly, the present disclosure relates to charging ports for electric vehicles.

SUMMARY

Embodiments of the present disclosure advantageously provide a charging port for an electric vehicle that includes a charging socket, a push rod actuator, and a push rod coupled to the push rod actuator. The charging socket is configured to receive a charging connector of a charger (e.g., a charging station, a wall charger, a portable charger, etc.). The push rod is configured to decouple the charging connector from the charging socket when the push rod is displaced (moved, translated, etc.) from a retracted position to an extended position by the push rod actuator.

DETAILED DESCRIPTION

Figure 1:
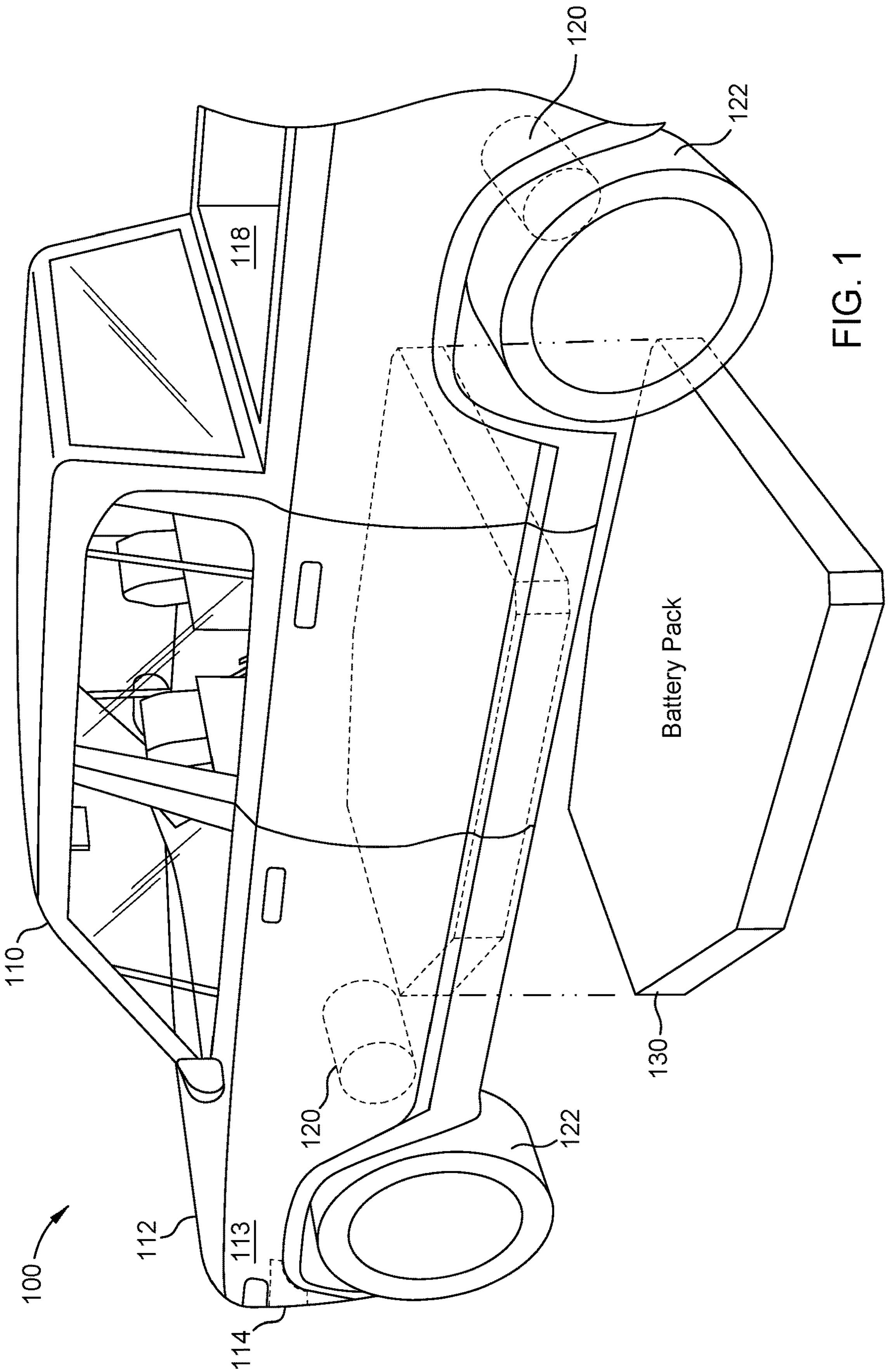
FIG. 1 depicts a diagram of an example electric vehicle, in accordance with certain embodiments of the present disclosure.

Public electric vehicle charging stations are often placed in parking lots behind businesses that are closed at night and do not experience much (if any) foot traffic or attention. These (and other) locations present challenges for electric vehicle drivers with respect to personal security, personal safety, etc. During a public charging session, an electric vehicle driver typically sits inside the vehicle, with the doors locked and the windows raised, waiting for the charge to complete. If a person approaches the vehicle to gain entry to the cabin, frunk, trunk or bed, the electric vehicle driver cannot simply drive away. Instead, the driver must unlock the door (or lower the window), exit the vehicle (or lean out the window), and manually uncouple the charging connector of the electric vehicle charging station from the charging port of the vehicle before driving away.

Embodiments of the present disclosure advantageously decouple (e.g., disconnect, disengage, detach, release, separate, remove, etc.) the charging connector of an electric vehicle charger from the charging port of an electric vehicle without requiring the driver or passenger to exit the vehicle. In other words, the charging connector may be decoupled from the charging port without subjecting the driver to adverse or emergency conditions, such as security threats, safety hazards, environmental hazards, etc.

In many embodiments, a charging port for an electric vehicle includes a charging socket, a push rod actuator, and a push rod coupled to the push rod actuator. The charging socket is configured to receive a charging connector of a charger (e.g., a charging station, a wall charger, a portable charger, etc.). The push rod is configured to decouple the charging connector from the charging socket when the push rod is displaced from a retracted position to an extended position by the push rod actuator.

In many embodiments, the charging port also includes a base plate, a release plate and a latch interface. The release plate includes a rear surface attached to the push rod, and a front surface configured to contact at least a portion of the charging connector. The latch interface is rotatably coupled to the release plate, and is configured to engage a latch of the charging connector.

In many embodiments, a method for releasing a charging connector of an electric vehicle charger from a charging port of an electric vehicle, includes in response to a trigger event, activating, by a processor, a push rod actuator of the charging port; and, in response to the activating, displacing, by the push rod actuator, a push rod coupled to the push rod actuator from a retracted position to an extended position to decouple the charging connector from a connector socket of the charging port.

Embodiments of the present disclosure are not limited to the SAE J1772 CCS (combined charging system) Combo 1 connectors and sockets illustrated in the drawings. To the contrary, embodiments of the present disclosure are applicable to any charging connector, such as an SAE J1772 (IEC 62196 Type 1) connector, an IEC 62196 Type 2 connector, an IEC 62196 Type 2 CCS Combo 2 connector, etc.

Generally, the actuator is activated by a trigger event. The trigger event may be initiated by the driver, such as by placing the transmission in reverse and then confirming the release of the charging connector by selecting a graphical user interface (GUI) widget (e.g., a button, a slider, etc.) displayed on a touchscreen, activating a manual switch inside the vehicle cabin, etc. The trigger event may also be initiated by an electronic control unit (ECU) in response to a trigger event detection process, such as a security threat identified in camera images, undesired motion detected by accelerometers, excessive heat outside the vehicle detected by temperature sensors, etc.

FIG. 1 depicts a diagram of electric vehicle 100, in accordance with embodiments of the present disclosure.

Electric vehicle 100 includes, inter alia, a body, a propulsion system, an energy storage system, an auxiliary or accessory system, etc. Body 110 includes, inter alia, a frame or chassis, front end 112, driver side front quarter panel 113 with charging port cover 114, driver/passenger compartment or cabin 116, trunk or bed 118, a rear end, a frunk, stowage compartments, etc. Charging port cover 114 is located in driver side front quarter panel 113, and protects the charging port from the environment. Other charging port locations are also supported, such as the passenger side front quarter panel, the driver side rear quarter panel, the passenger side rear quarter panel, the rear end, in front end 112, etc. Additional charging ports may also be provided.

The propulsion system includes, inter alia, one or more electronic control units (ECUs), one, two or four (or more) electric motors 120 with associated transmissions and drivetrains, a suspension subsystem, a steering subsystem, wheels 122, etc. The energy storage system includes, inter alia, one or more electronic control units (ECUs), battery pack 130, a vehicle charging subsystem including the charging port, etc. The auxiliary or accessory system includes, inter alia, one or more electronic control units (ECUs), an electrical power distribution system, a heating and air conditioning system, cabin displays, interior and exterior lighting systems, integrated electrical devices, etc.

Figure 2:
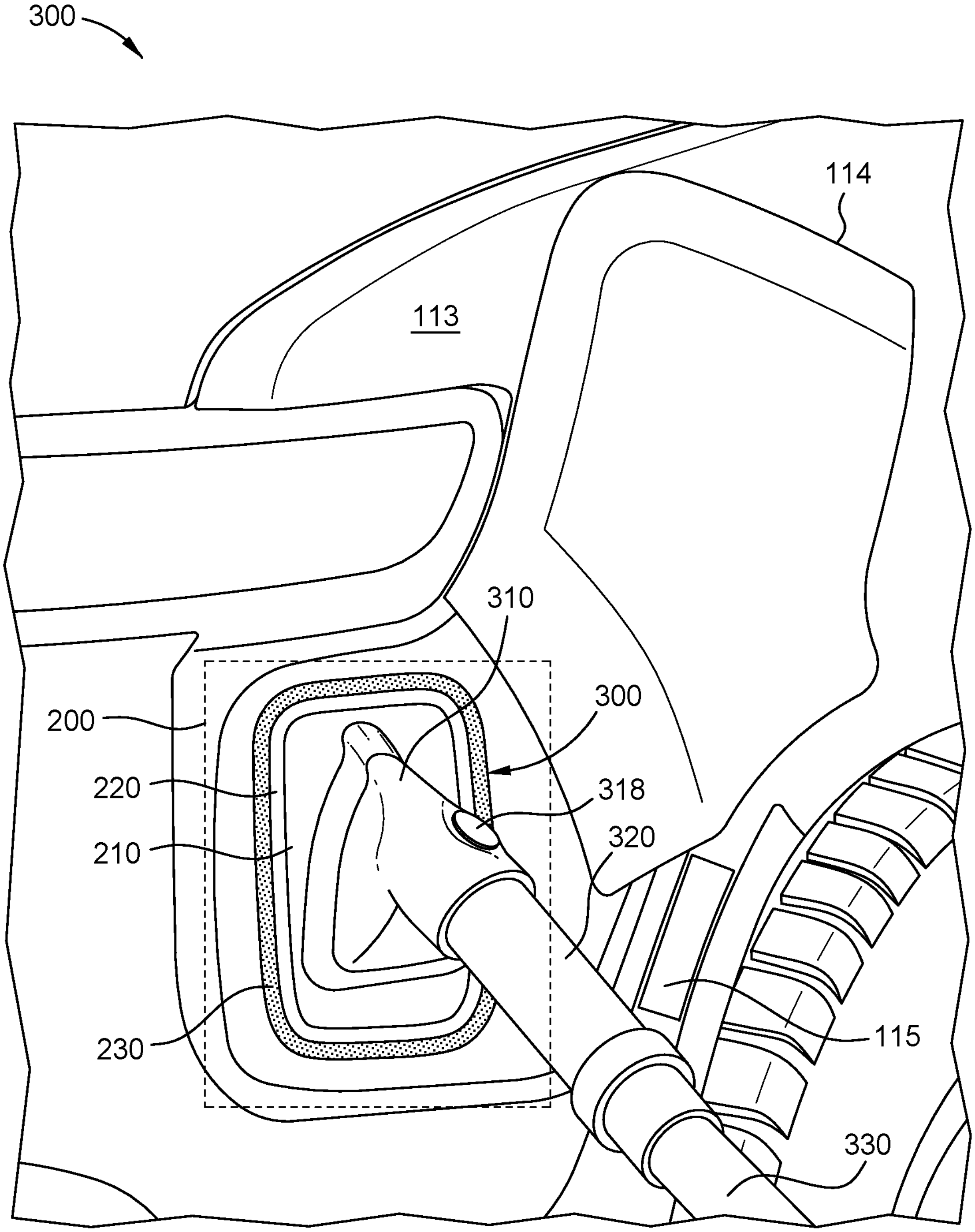
FIG. 2 depicts a charging connector of an electric vehicle charger coupled to an example charging port of the example electric vehicle of FIG. 1, in accordance with embodiments of the present disclosure.

FIG. 2 depicts charging connector 300 of an electric vehicle charger coupled to charging port 200 of electric vehicle 100, in accordance with embodiments of the present disclosure.

Charging port cover 114 is depicted in the open position, which exposes charging port 200 located in driver side front quarter panel 113. Charging port cover 114 may be opened and closed by pressing mechanical button 115 located adjacent to charging port cover 114. In certain embodiments, charging port cover 114 may also be opened and closed inside cabin 116 by the driver or passenger, such as by actuating a mechanical button, switch, etc., and/or actuating a GUI widget (e.g., a button, a slider, etc.) displayed on a touchscreen, actuating a GUI widget (e.g., a button, a slider, etc.) displayed on a smartphone, etc.

Charging port 200 includes, inter alia, charging socket 210 and housing 220. Charging status indicator light 230 may also be provided.

Charging connector 300 is connected to electric vehicle charger cable 330 and includes, inter alia, connector housing 310, latch release button 318 and handle 320.

Figure 3:
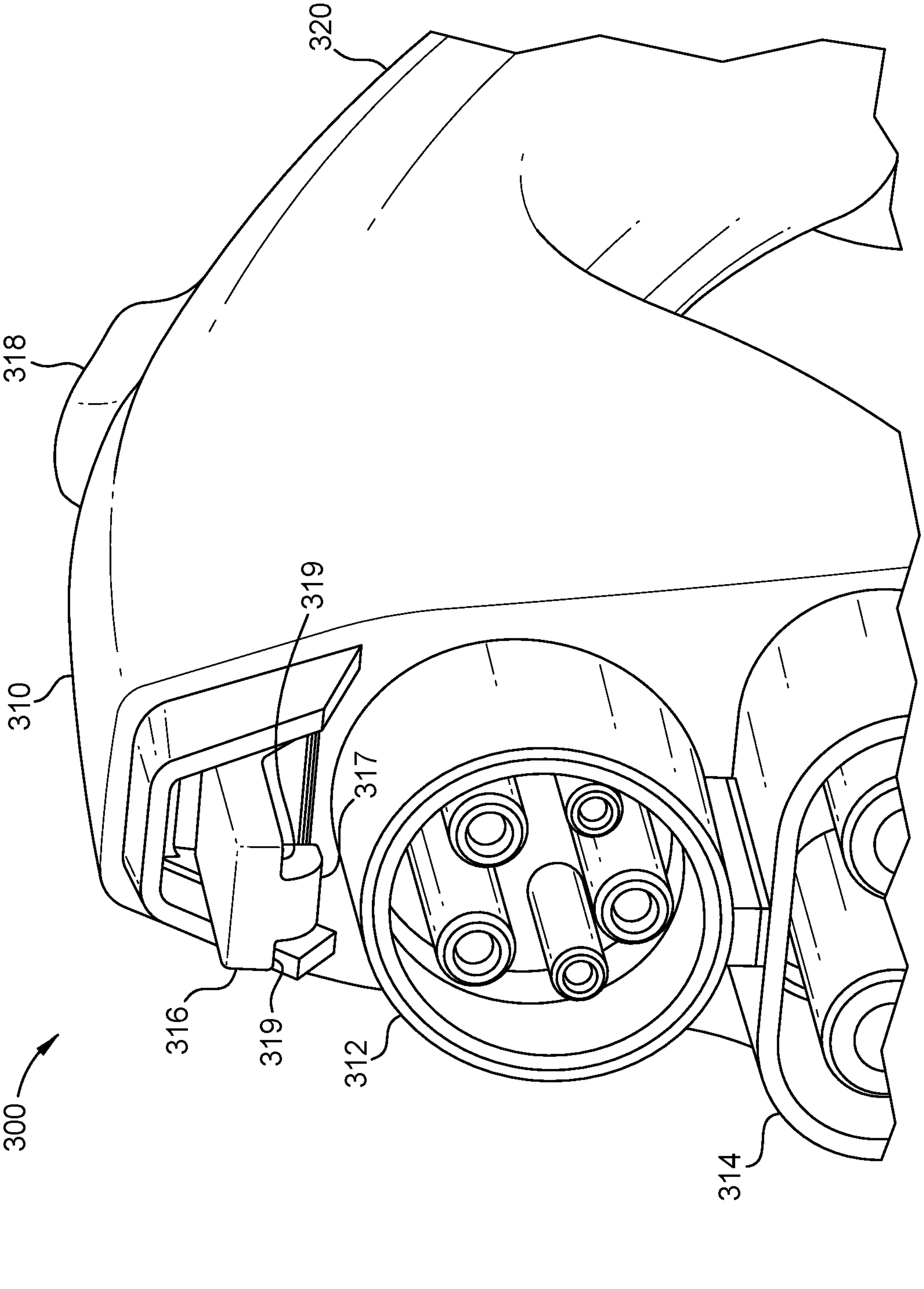
FIG. 3 depicts an example charging connector of the electric vehicle charger.

FIG. 3 depicts charging connector 300 of an electric vehicle charger.

Charging connector 300 includes, inter alia, connector housing 310, plug 312, latch 316, latch release button 318 and handle 320. In many embodiments, charging connector 300 also includes plug 314. Latch 316 includes hook portion 317 disposed along a centerline of latch 316, and shoulder portions 319 disposed on either side of hook portion 317 to form a T-shaped cross-section.

For a J1772 connector, plug 312 includes five electrical connector pins, i.e., AC line, AC line/neutral, proximity pilot, control pilot and protective earth pins. For a J1772 CCS Combo 1 connector, plug 312 includes five electrical connector pins, i.e., AC line, AC line/neutral, proximity pilot, control pilot and protective earth pins, and plug 314 includes two electrical connector pins, i.e., DC+ and DC− pins. Embodiments of the present disclosure also support other connectors, such as an IEC 62196 Type 2 connector, an IEC 62196 Type 2 CCS Combo 2 connector, etc.

Electric vehicle charger cable 330 is connected to the electric vehicle charger, such as a charging station, a wall charger, a portable charger, etc.

Figure 4A:
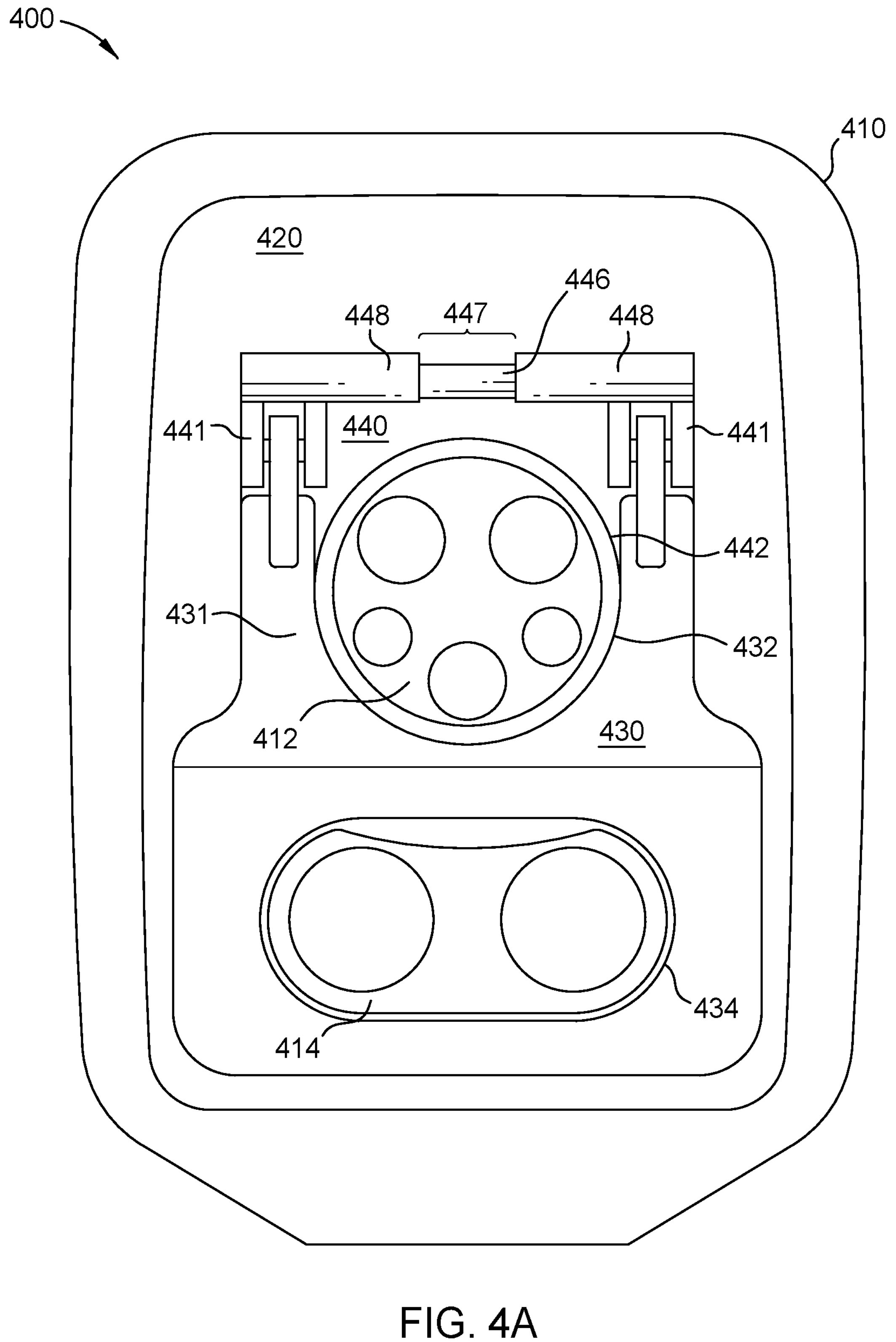
FIG. 4A depicts a front view of an example charging port of the example electric vehicle, in accordance with embodiments of the present disclosure.

FIG. 4A depicts a front view of charging port 400 of electric vehicle 100, in accordance with embodiments of the present disclosure.

Charging port 400 includes, inter alia, frame 410, connector socket 412, base plate 420, release plate 430, and a push rod connected to a push rod actuator (depicted in subsequent figures). In many embodiments, charging port 400 also includes connector socket 414. It should be noted that a charging connector 300 with a single plug 312 may be used with a charging port 400 with a single connector socket 412 or a charging port 400 with connector socket 412 and connector socket 414. However, a charging connector 300 with plug 312 and plug 314 must be used with a charging port 400 that includes connector socket 412 and connector socket 414.

Connector socket 412 is mounted to frame 410 and is configured to receive plug 312 of charging connector 300 (e.g., an SAE J1772 connector, the upper portion of an SAE J1772 CCS Combo 1 connector, etc.). Similarly, connector socket 414 is mounted to frame 410 and is configured to receive plug 314 of charging connector 300 (e.g., the lower portion of an SAE J1772 CCS Combo 1 connector, etc.).

Base plate 420 is mounted to frame 410. Release plate 430 may be mounted to base plate 420 using guide shafts and linear bushings (depicted in subsequent figures); other mounting techniques are also supported. Release plate 430 is connected to the push rod, and is displaceable (moveable, translatable, etc.) between a retracted position (depicted in FIG. 4A) and an extended position (depicted in subsequent figures). Generally, release plate 430 is displaceable along a path or axis that is parallel to the longitudinal axes of connector socket 412 and connector socket 414. Front surface 431 is configured to contact at least a portion of charging connector 300, such as the leading edges of plug 312 and plug 314, the shoulders of plug 312 and plug 314, etc.

Release plate 430 defines opening 432 that is configured to receive connector socket 412, and opening 434 that is configured to receive connector socket 414. Opening 432 allows the passage of connector socket 412 through release plate 430 during the displacement (movement, translation, etc.) of release plate 430. Similarly, opening 434 allows the passage of connector socket 414 through release plate 430 during the displacement of release plate 430.

In many embodiments, release plate 430 includes latch interface 440 that is configured to engage latch 316 of charging connector 300. Latch interface 440 may be rotatably coupled to release plate 430 using a pair of hinges 441. For example, each hinge 441 may include a bracket attached to latch interface 440, an inner arm attached to release plate 430, a pivot pin, and a spring which is arranged to apply a bias torque to latch interface 440. During displacement of release plate 430, the bias torque causes the legs of latch interface 440 to rotate away from the rear surface of release plate 430 and the upper portion of latch interface 440 to rotate toward charge connector 300. Other rotational couplings are also supported.

Latch interface 440 defines opening 442 that is configured to receive connector socket 412, and central opening 447 that is configured to receive hook portion 317 of latch 316. Opening 442 allows the passage of connector socket 412 through latch interface 440 during the rotation of latch interface 440 and the displacement of release plate 430. Latch interface 440 includes locking surface 446 (e.g. a rod, a shaft, a pin, etc.) that extends laterally through central opening 447, and cam surfaces 448 that are disposed on either side of central opening 447. Locking surface 446 is configured to engage hook portion of latch 316, and cam surfaces 448 are configured to contact shoulder portions 319 of latch 316 to prevent latch 316 from re-engaging locking surface 446 as latch interface 440 rotates clockwise during decoupling.

Latch interface 440 is displaceable between a latch lock position (depicted in FIG. 4A) and a latch release position (depicted in subsequent figures). In the latch lock position, locking surface 446 engages hook portion of latch 316 and prevents charging connector 300 from decoupling from charging port 400. In the latch release position, locking surface 446 does not engage hook portion of latch 316, and allows charging connector 300 to decouple from charging port 400. The latch lock position of latch interface 440 coincides with the retracted position of release plate 430, and the latch release position of latch interface 440 coincides with the extended position of release plate 430 (depicted in subsequent figures).

Figure 4B:
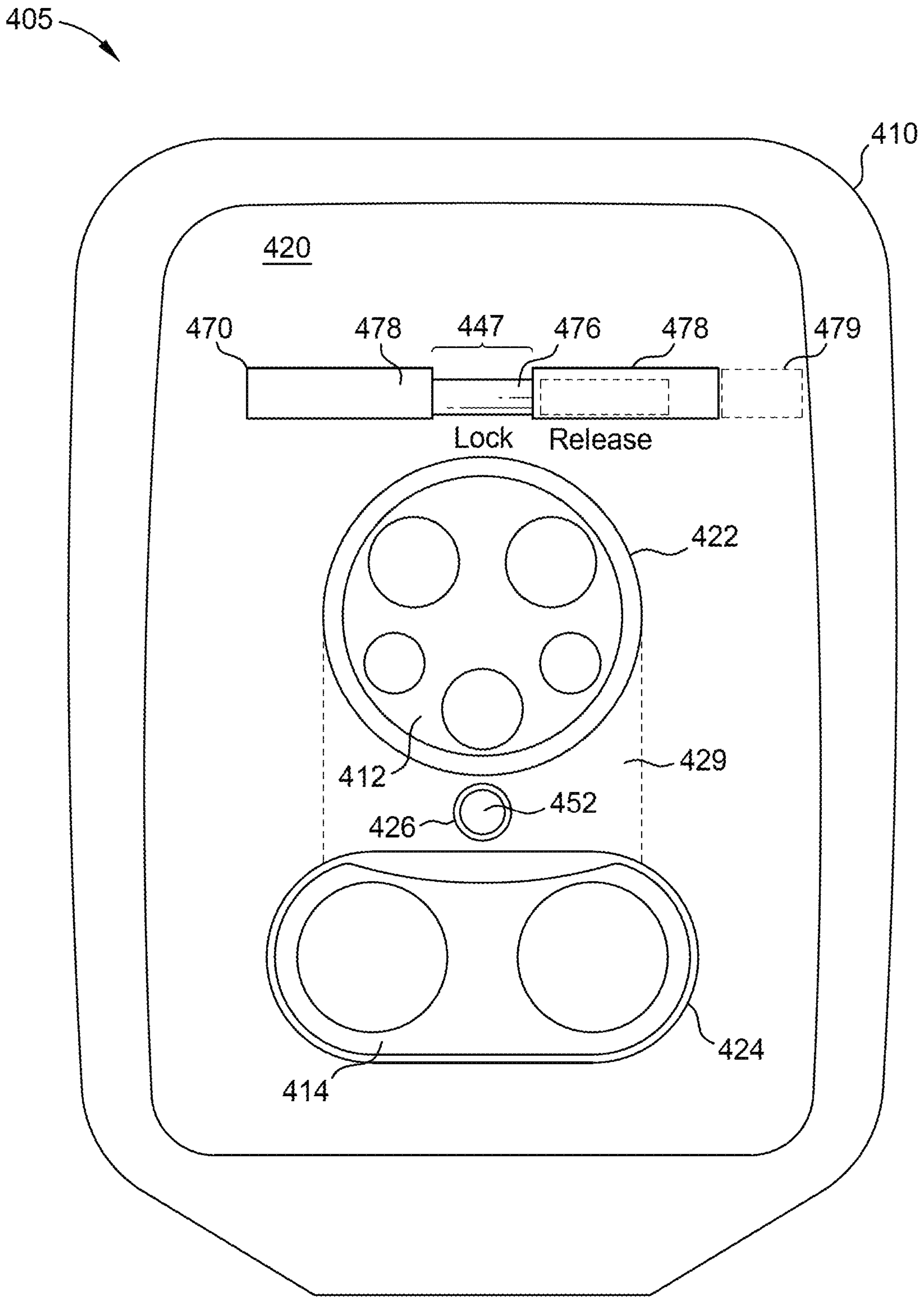
FIG. 4B depicts a front view of another example charging port of the example electric vehicle, in accordance with embodiments of the present disclosure.

FIG. 4B depicts a front view of charging port 405 of electric vehicle 100, in accordance with embodiments of the present disclosure.

Charging port 405 includes, inter alia, frame 410, connector socket 412, base plate 420, and push rod 452 connected to a push rod actuator. In many embodiments, charging port 405 also includes connector socket 414. It should be noted that a charging connector 300 with a single plug 312 may be used with a charging port 405 with a single connector socket 412 or a charging port 405 with connector socket 412 and connector socket 414. However, a charging connector 300 with plug 312 and plug 314 must be used with a charging port 405 that includes connector socket 412 and connector socket 414.

Connector socket 412 is mounted to frame 410 and is configured to receive plug 312 of charging connector 300 (e.g., an SAE J1772 connector, the upper portion of an SAE J1772 CCS Combo 1 connector, etc.). Similarly, connector socket 414 is mounted to frame 410 and is configured to receive plug 314 of charging connector 300 (e.g., the lower portion of an SAE J1772 CCS Combo 1 connector, etc.).

Base plate 420 is mounted to frame 410. Base plate 420 defines opening 422 that is configured to receive connector socket 412, opening 424 that is configured to receive connector socket 414, and opening 426 that is configured to receive push rod 452. Opening 426 allows the passage of push rod 452 during displacement.

Push rod 452 is displaceable between a retracted position and an extended position. Generally, push rod 452 is displaceable along an axis that is parallel to the longitudinal axes of connector socket 412 and connector socket 414. The distal (front) end of push rod 452 is configured to contact at least a portion of charging connector 300, such as the portion of connector housing 310 located between plug 312 and plug 314, the leading edge of plug 312 or plug 314, etc.

In certain embodiments, base plate 420 includes release plate 429 (outlined in phantom in FIG. 4B), which is attached to push rod 452 and is displaceable between the retracted position (e.g., flush with base plate 420) and the extended position. Release plate 429 is a displaceable segment of base plate 420 that increases the contact area with charging connector 300, and functions in a similar manner to release plate 430.

In certain embodiments, latch interface 470 is fixed to base plate 420, and is configured to engage latch 316 of charging connector 300. Latch interface 470 defines central opening 477 that is configured to receive hook portion 317 of latch 316. Latch interface 470 includes locking surface 476, extending laterally through central opening 477, and support surfaces 478 disposed on either side of central opening 477. Locking surface 476 is configured to engage hook portion 317 of latch 316, and support surfaces 478 are configured to contact shoulder portions 319 of latch 316. Generally, locking surface 476 is coupled to a locking surface actuator 479, and is displaceable between a latch lock position and a latch release position. In the latch lock position, locking surface 476 engages hook portion 317 of latch 316 and prevents charging connector 300 from decoupling from charging port 405. In the latch release position, locking surface 476 does not engage hook portion of latch 316, and allows charging connector 300 to decouple from charging port 400.

In many embodiments, locking surface 476 is a rod, shaft, pin, shelf, etc., that is coupled to a linear actuator, such as a linear latching solenoid, etc. In such embodiments, the linear actuator causes the locking surface 476 to translate from the latch lock position (depicted in FIG. 4B) to the latch release position (i.e., outlined in phantom in FIG. 4B). Other actuator types are also supported, such as a rotary actuator, etc.

In other embodiments, locking surface 476 is a rod, shaft, pin, shelf, etc., that is made from shape memory alloy (SMA). In these embodiments, locking surface 476 is coupled to a heat source, a current source, etc., that causes locking surface 476 to transition from the latch lock position (i.e., the deformed shape of locking surface 476) to the latch release position (i.e., the original shape of locking surface 476). Removing the heat, removing the current, etc., causes the locking surface 476 to transition from the latch release position (i.e., the original shape) back to the latch lock position (i.e., the deformed shape). The SMA may be made from copper-aluminum-nickel, nickel-titanium (NiTi), alloys of zinc, copper, gold and iron, etc.

Figure 5A:
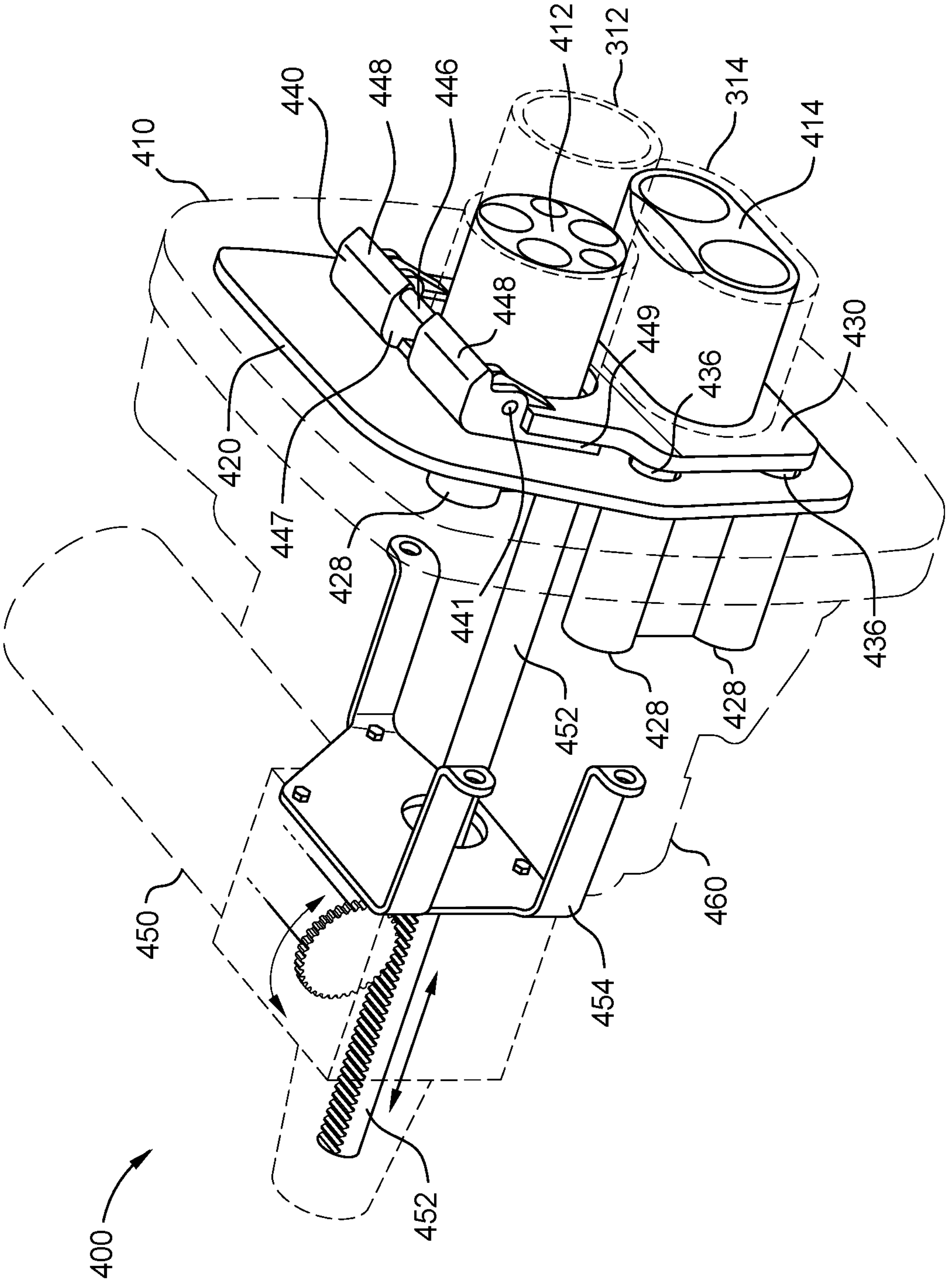
FIG. 5A depicts a front perspective view of the example charging port depicted in FIG. 4A, in accordance with embodiments of the present disclosure.

FIG. 5A depicts a front perspective view of charging port 400, in accordance with embodiments of the present disclosure.

Charging port 400 includes, inter alia, frame 410 (shown in phantom), connector socket 412, connector socket 414, base plate 420, release plate 430, latch interface 440, push rod actuator 450, push rod 452, and housing 460 (shown in phantom). Base plate 420 includes four linear bushings 428, and release plate 430 includes four corresponding guide shafts 436; other mounting configurations are also supported. Latch interface 440 includes locking surface 446 that extends through central opening 447, cam surfaces 448 on either side of central opening 447, and legs 449. Push rod actuator 450 may be a linear actuator, such as a worm gear actuator, etc., and may be attached to housing 460 by bracket 454. A portion of push rod actuator 450 is cut away to show a rear (proximal) end of push rod 452. The distal end of push rod 452 is attached to release plate 430.

In this view, latch interface 440 is disposed in the latch lock position, and push rod 452 and release plate 430 are disposed in the retracted position. When charging connector 300 is coupled to (i.e., plugged into) charging port 400, plug 312 engages connector socket 412, plug 314 engages connector socket 414, and hook portion 317 of latch 316 engages latch interface 440 to securely couple charging connector 300 to charging port 400. Charging connector 300 may be manually decoupled from charging port 400 simply by depressing latch release button 318 and removing (i.e., withdrawing, unplugging, etc.) charging connector 300 from charging port 400.

Figure 5B:
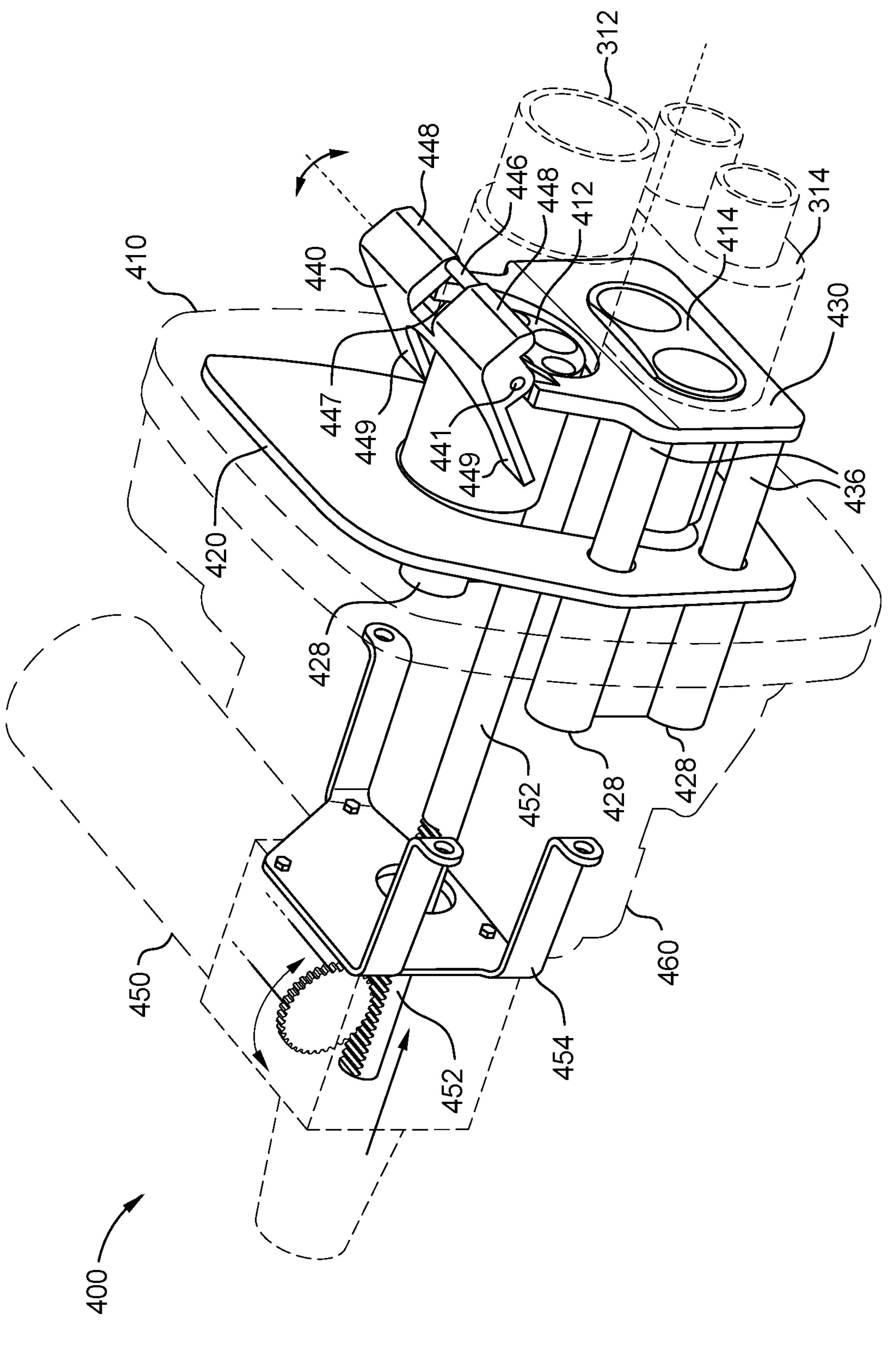
FIG. 5B depicts a front perspective view of the example charging port depicted in FIG. 4A, in accordance with embodiments of the present disclosure.

FIG. 5B depicts a front perspective view of charging port 400, in accordance with embodiments of the present disclosure.

In response to a trigger event (discussed below), push rod actuator 450 is activated and begins displacing push rod 452 and release plate 430, along the displacement axis, from the retracted position towards the extended position. When release plate 430 begins displacing, latch interface 440 begins rotating clockwise (i.e., towards charging connector 300), about the rotation axis, due to the bias torque provided by the springs of hinges 441, and release plate 430 begins uncoupling (i.e., pushing) plug 312 from connector socket 412 and uncoupling (i.e., pushing) plug 314 from connector socket 414. In many embodiments, the orientation of rotation axis is perpendicular to the displacement axis. Other orientations are also supported.

When release plate 430 reaches the extended position (depicted in FIG. 5B), locking surface 446 has rotated out of engagement with hook portion 317 of latch 316 and latch interface 440 is disposed in the latch release position, plug 312 has been decoupled from connector socket 412, and plug 314 has been decoupled from connector socket 414. At this time, charging connector 300 may simply fall away from charging port 400 under the influence of gravity. However, if charging connector 300 remains partially engaged with latch interface 440, and/or plug 312 remains partially coupled to connector socket 412, and/or plug 314 remains partially coupled to connector socket 414, charging connector 300 may be completely removed from charging port 400 in response to the application of tension to electric vehicle charger cable 330, such as by a charging station tensioning device attached to charging connector 300 (as discussed below), by simply driving electric vehicle 100 away from the charging station, etc.

After release plate 430 reaches the extended position, push rod actuator 450 reverses direction and begins displacing push rod 452 and release plate 430, along the displacement axis, from the extended position towards the retracted position. Legs 449 of latch interface 440 contact and then slide against base plate 420, causing latch interface 440 to rotate counterclockwise (i.e., towards base plate 420) against the bias torque provided by the springs of hinges 441.

In certain embodiments, push rod actuator 450 may pause for a predetermined time period before displacing push rod 452 and release plate 430 back to the retracted position. When release plate 430 reaches the retracted position (depicted in FIG. 5A), latch interface 440 is disposed in the latch release position, and charging port 400 is ready to receive charging connector 300.

Figure 6A:
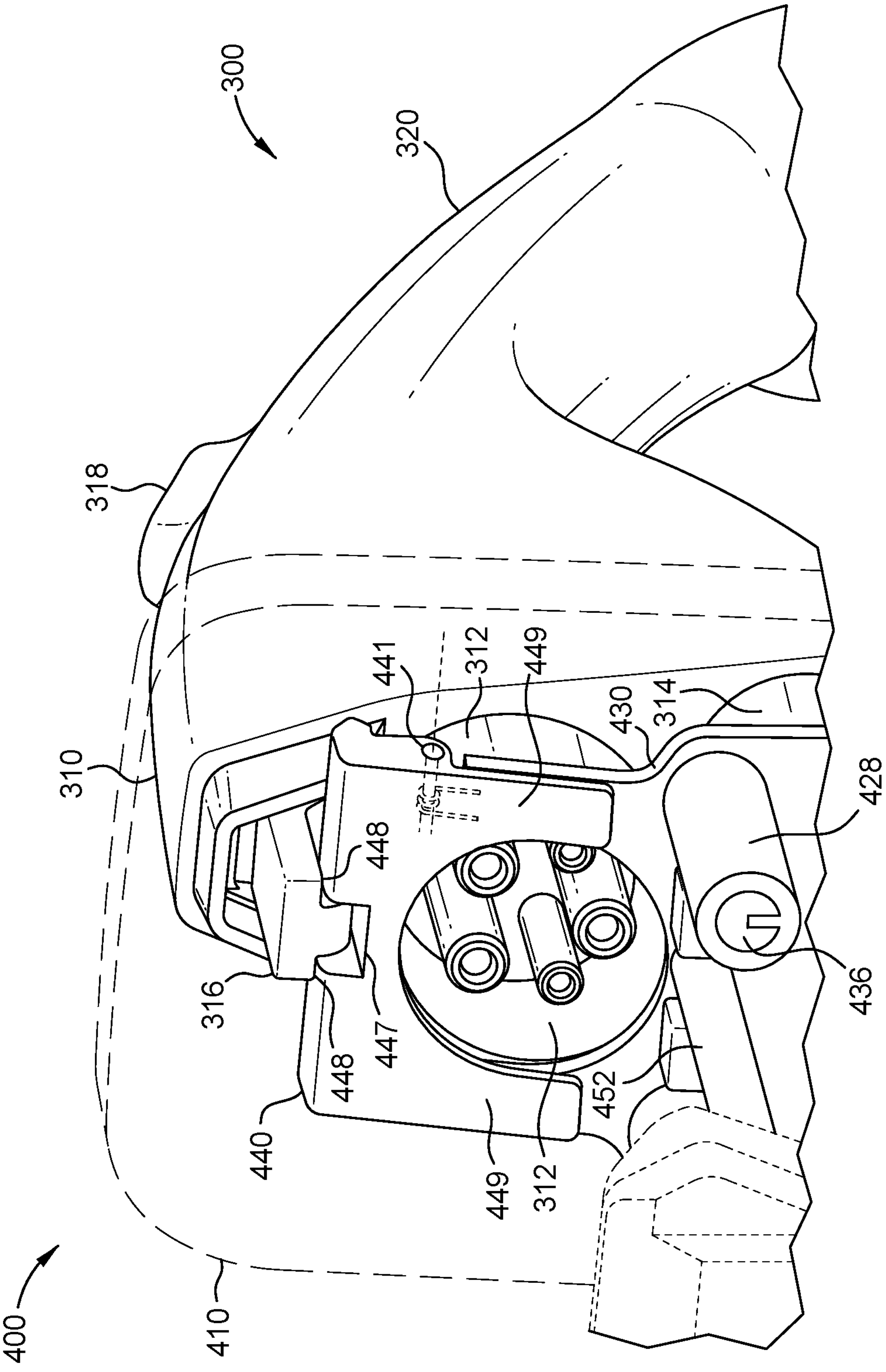
FIG. 6A depicts a rear perspective view of a charging connector and a portion of the example charging port depicted in FIG. 4A in a first configuration, in accordance with embodiments of the present disclosure.

FIG. 6A depicts a rear perspective view of charging connector 300 and a portion of charging port 400 in a first configuration, in accordance with embodiments of the present disclosure.

As shown, charging connector 300 is coupled to charging port 400. With respect to charging connector 300, the following components are shown: connector housing 310, plug 312, plug 314, latch 316, latch release button 318 and handle 320. With respect to charging port 400, the following components are shown: frame 410 (shown in phantom), connector socket 412, connector socket 414, linear bushing 428, release plate 430 with guide shaft 436, latch interface 440 with hinge(s) 441, central opening 447, cam surfaces 448 and legs 449, and push rod 452.

In the first configuration of charging port 400, latch interface 440 is disposed in the latch lock position, and push rod 452 and release plate 430 are disposed in the retracted position. The displacement axis of push rod 452 and release plate 430, and the rotation axis of latch interface 440, are also shown.

Figure 6B:
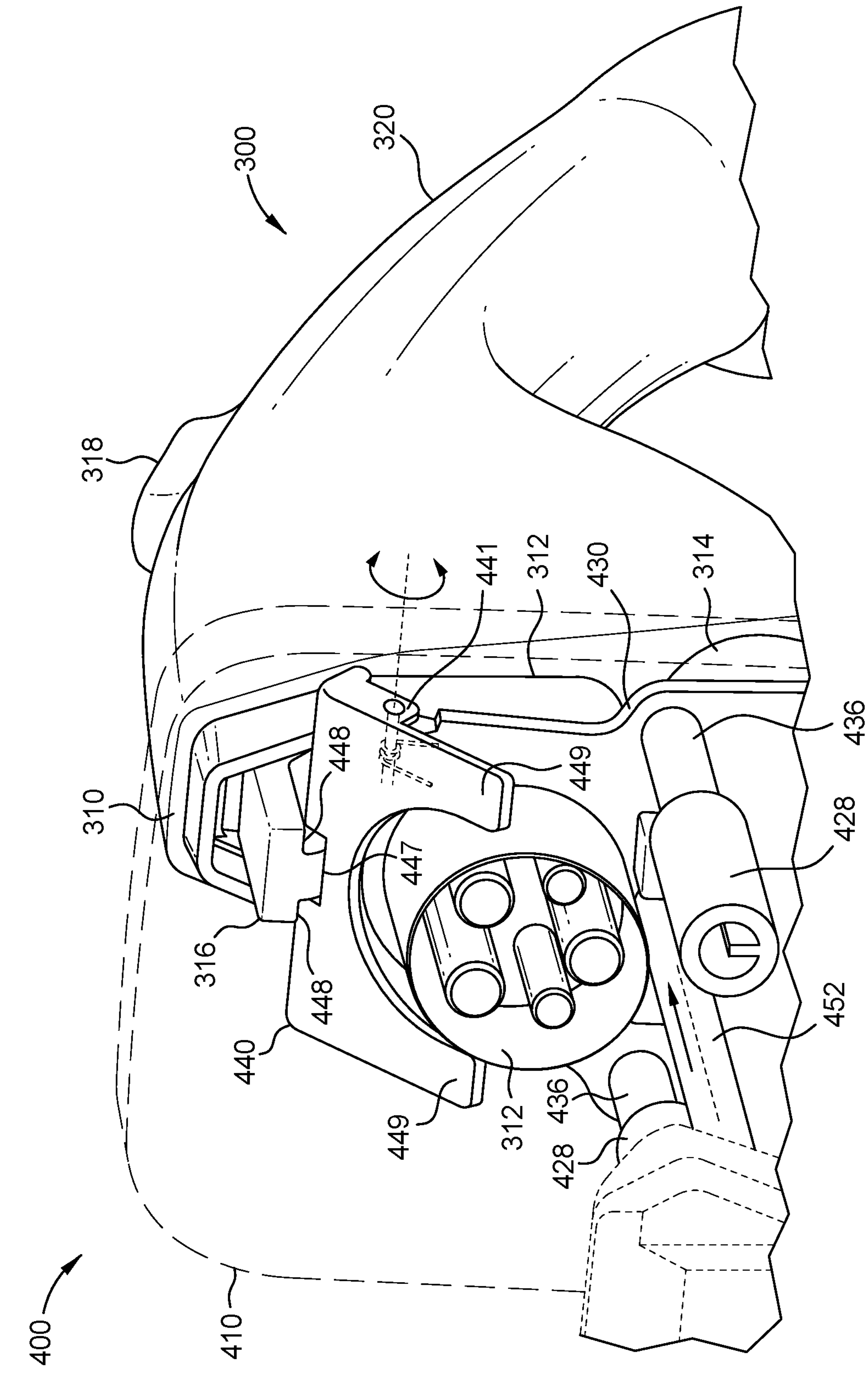
FIG. 6B depicts a rear perspective view of the charging connector and the portion of the example charging port depicted in FIG. 4A in a second configuration, in accordance with embodiments of the present disclosure.

FIG. 6B depicts a rear perspective view of charging connector 300 and a portion of charging port 400 in a second configuration, in accordance with embodiments of the present disclosure.

In the second configuration of charging port 400, latch interface 440 is disposed in the latch release position, and push rod 452 and release plate 430 are disposed in the extended position. The displacement and displacement axis of push rod 452 and release plate 430, and the rotation and rotation axis of latch interface 440, are also shown. In this view, charging connector 300 has not yet fallen away from charging port 400.

Figure 7A:
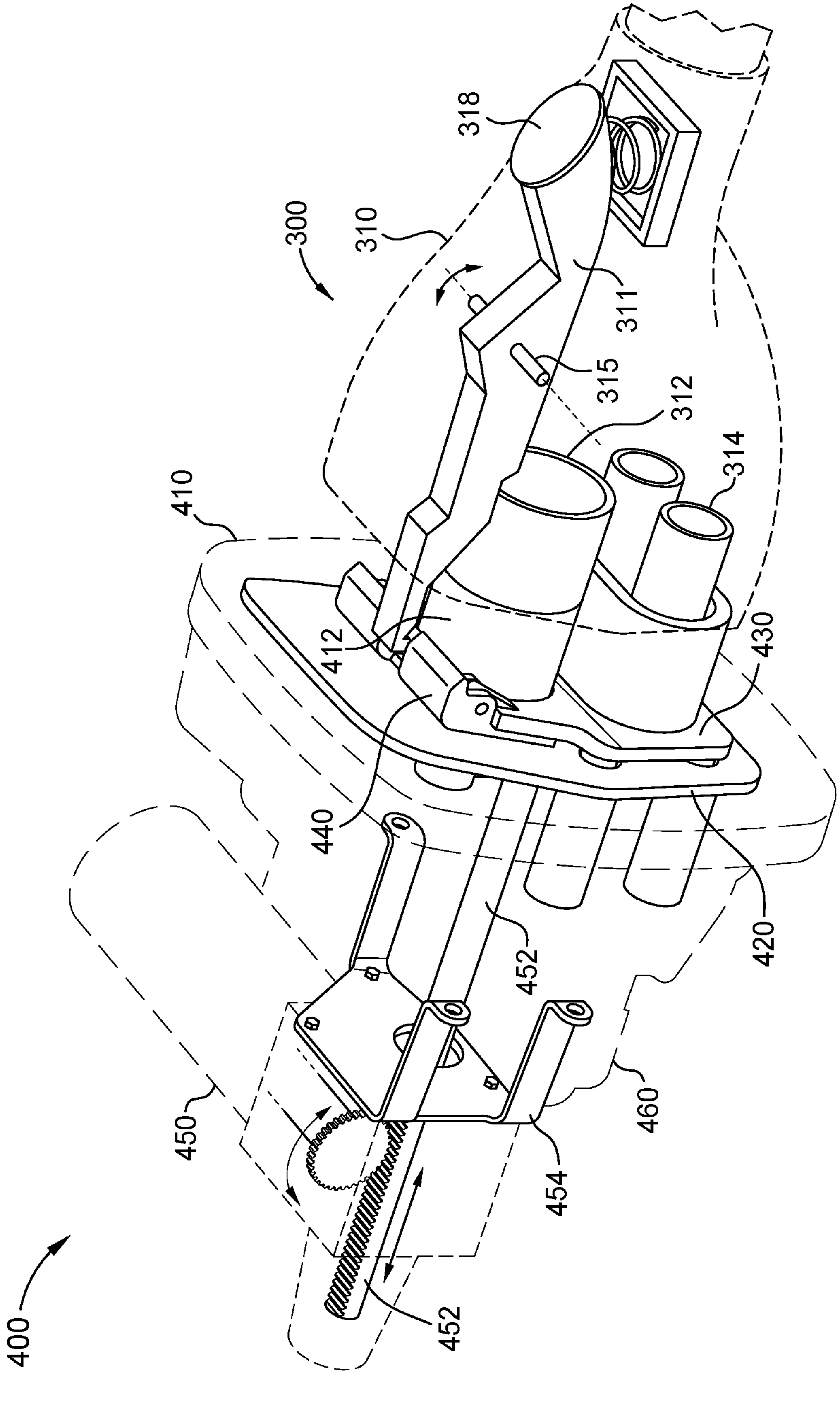
FIG. 7A depicts a front perspective view of a charging connector and the example charging port depicted in FIG. 4A in the first configuration, in accordance with embodiments of the present disclosure.

FIG. 7A depicts a front perspective view of charging connector 300 and charging port 400 in the first configuration, in accordance with embodiments of the present disclosure.

Charging connector 300 is coupled to charging port 400. With respect to charging connector 300, the following components are identified: connector housing 310 (shown in phantom), latch arm 311, plug 312, plug 314, latch pivot pin 315, latch 316, latch release button 318 and handle 320. Latch 316 is disposed at the distal end of latch arm 311, and latch release button 318 is disposed at the proximal end of latch arm 311. Latch arm 311 pivots about latch pivot pin 315, and may be spring-loaded to maintain latch 316 in the proper orientation with respect to locking surface 446 of latch interface 440.

With respect to charging port 400, the following components are identified: frame 410 (shown in phantom), base plate 420, release plate 430, latch interface 440, push rod actuator 450, push rod 452, bracket 454 and housing 460. A portion of the rear of push rod actuator 450 is cut away to show the proximal end of push rod 452.

Latch interface 440 is disposed in the latch lock position, and push rod 452 and release plate 430 are disposed in the retracted position (i.e., the first configuration of charging port 400).

Figure 7B:
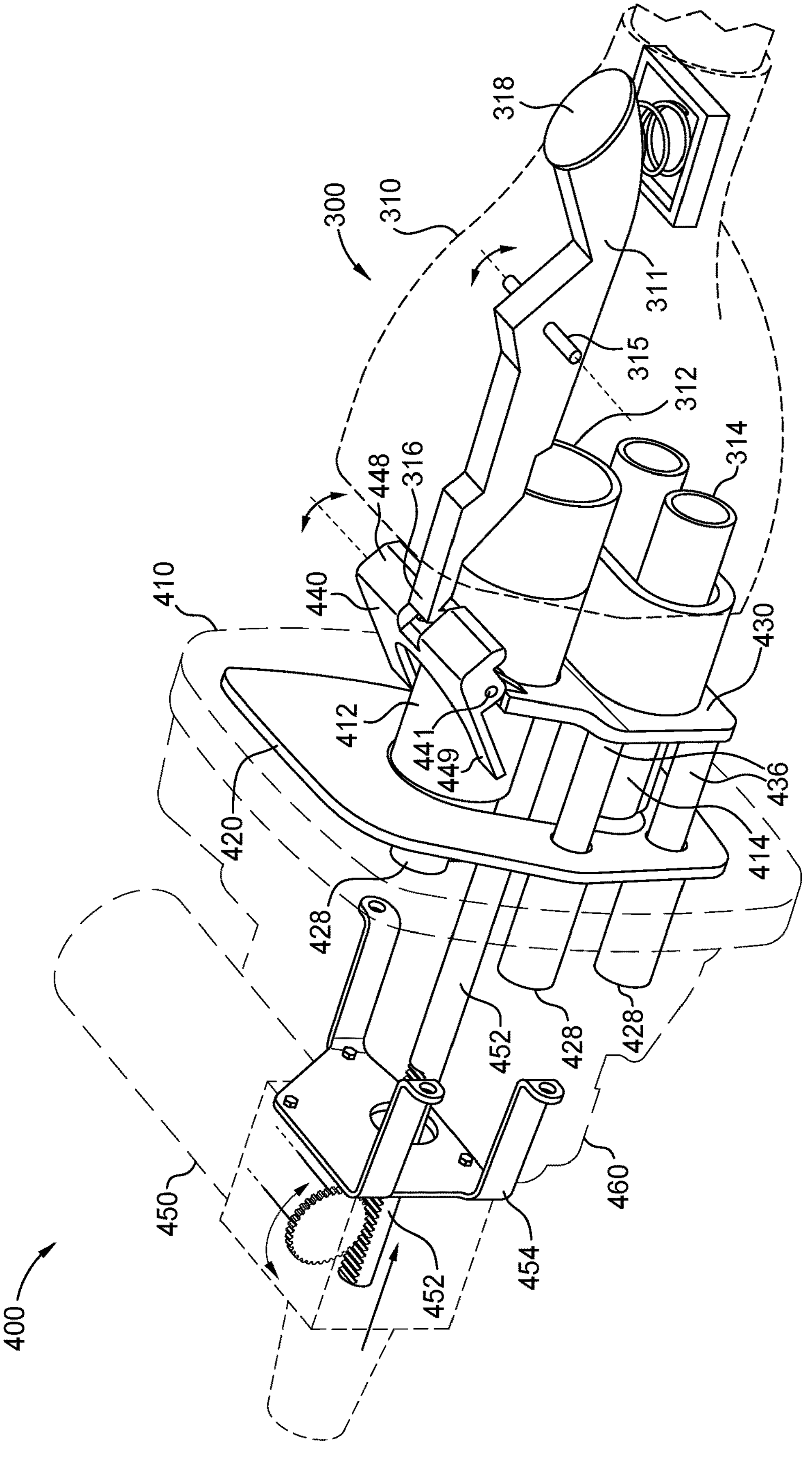
FIG. 7B depicts a front perspective view of the charging connector and the example charging port depicted in FIG. 4A in the second configuration, in accordance with embodiments of the present disclosure.

FIG. 7B depicts a front perspective view of charging connector 300 and charging port 400 in the second configuration, in accordance with embodiments of the present disclosure.

With respect to charging port 400, the following additional components are identified: linear bushings 428 of base plate 420, guide shafts 436 of release plate 430, and hinge(s) 441, cam surface(s) 448 and leg(s) 449 of latch interface 440.

Latch interface 440 is disposed in the latch release position, and push rod 452 and release plate 430 are disposed in the extended position (i.e., the second configuration of charging port 400). In this view, charging connector 300 has not yet fallen away from charging port 400.

Figure 7C:
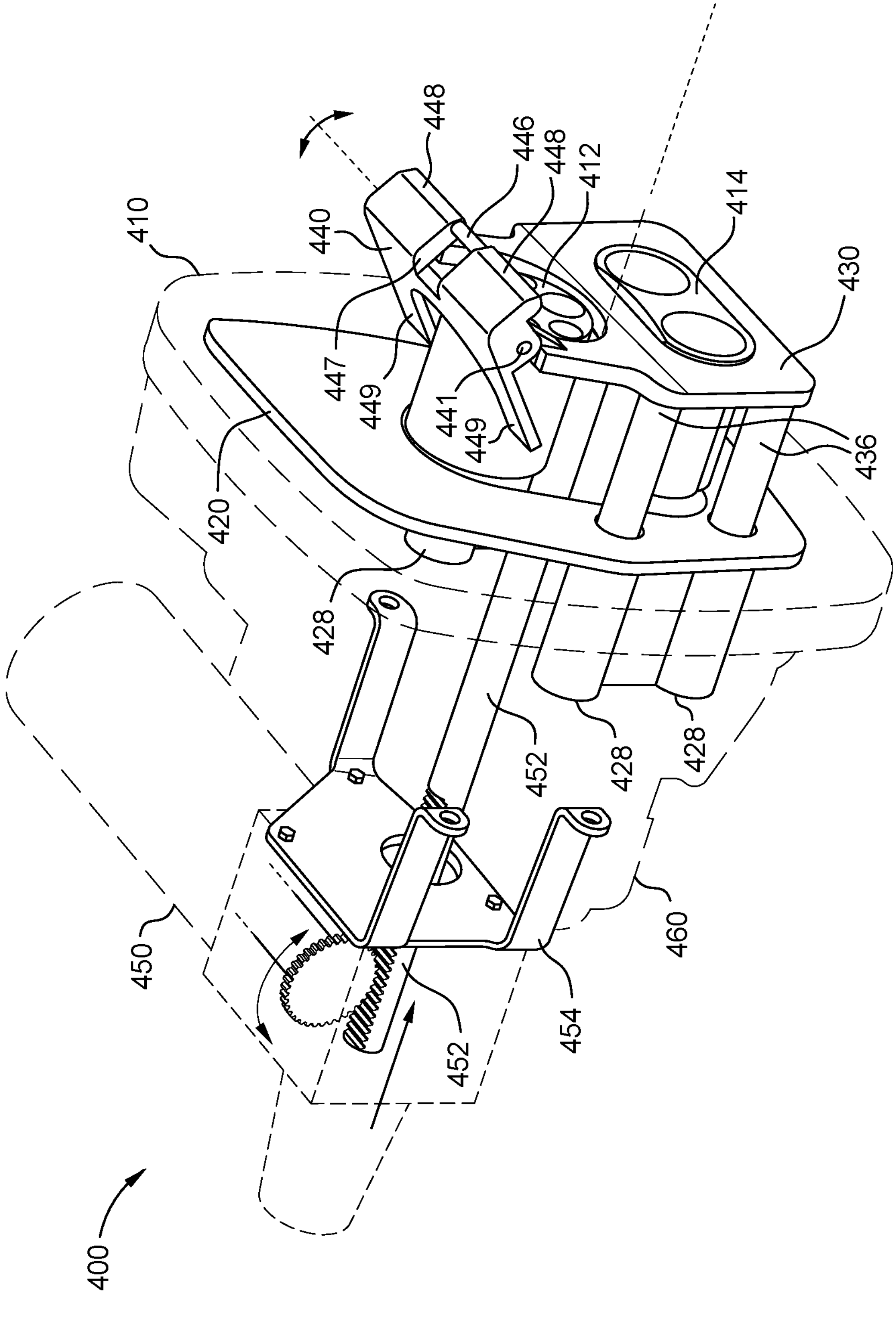
FIG. 7C depicts a front perspective view of the example charging port depicted in FIG. 4A in the second configuration, in accordance with embodiments of the present disclosure.

FIG. 7C depicts a front perspective view of charging port 400 in the second configuration, in accordance with embodiments of the present disclosure.

With respect to charging port 400, the following additional components are identified: connector socket 412, connector socket 414, and locking surface 446 of latch interface 440.

Latch interface 440 is disposed in the latch release position, and push rod 452 and release plate 430 are disposed in the extended position (i.e., the second configuration of charging port 400). In this view, charging connector 300 has fallen away from charging port 400.

Figure 7D:
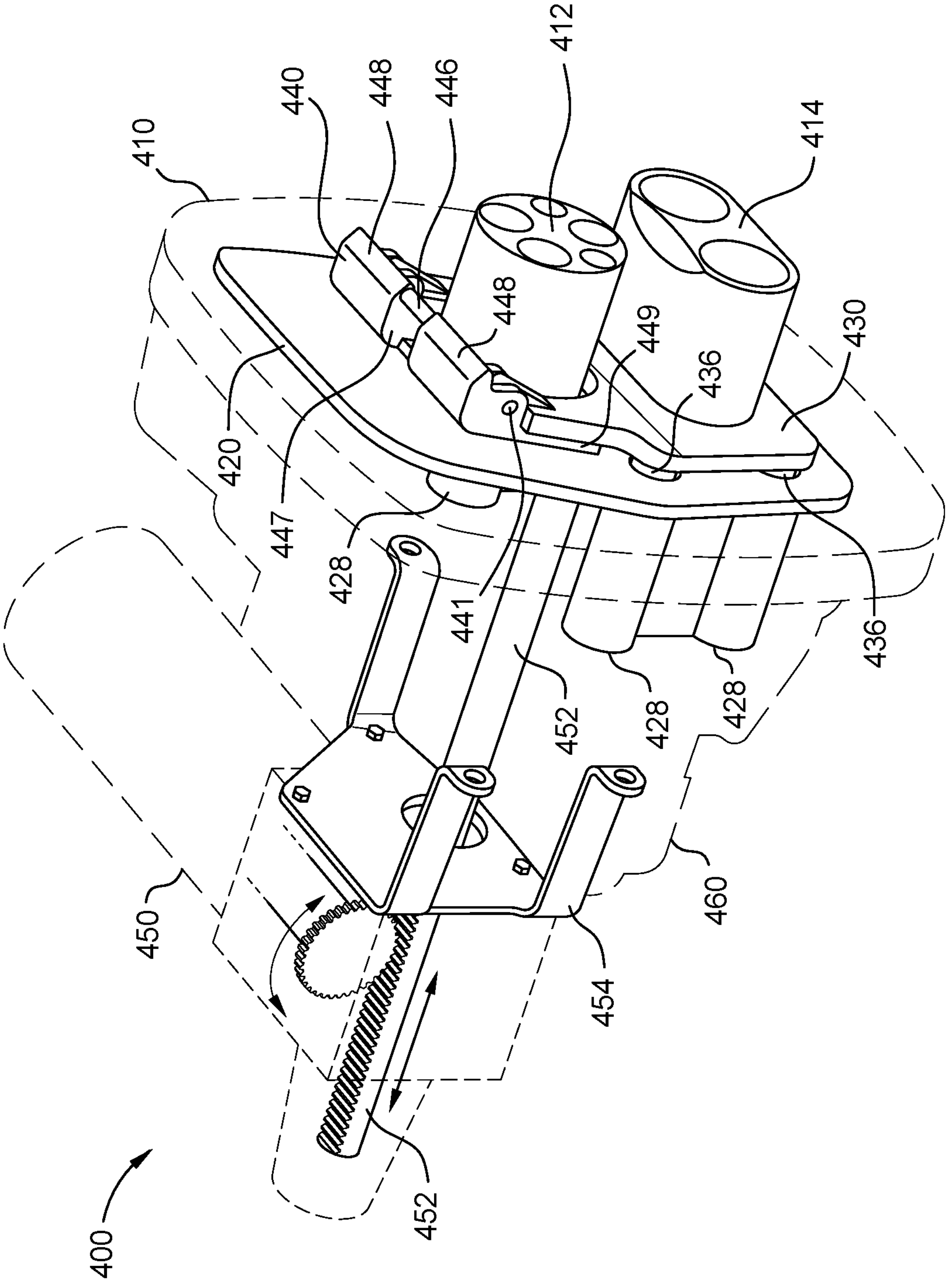
FIG. 7D depicts a front perspective view of the example charging port depicted in FIG. 4A in the first configuration, in accordance with embodiments of the present disclosure.

FIG. 7D depicts a front perspective view of charging port 400 in the first configuration, in accordance with embodiments of the present disclosure.

Latch interface 440 is disposed in the latch lock position, and push rod 452 and release plate 430 are disposed in the retracted position (i.e., the first configuration of charging port 400). In this view, charging port 400 is ready to receive charging connector 300.

Figure 8A:
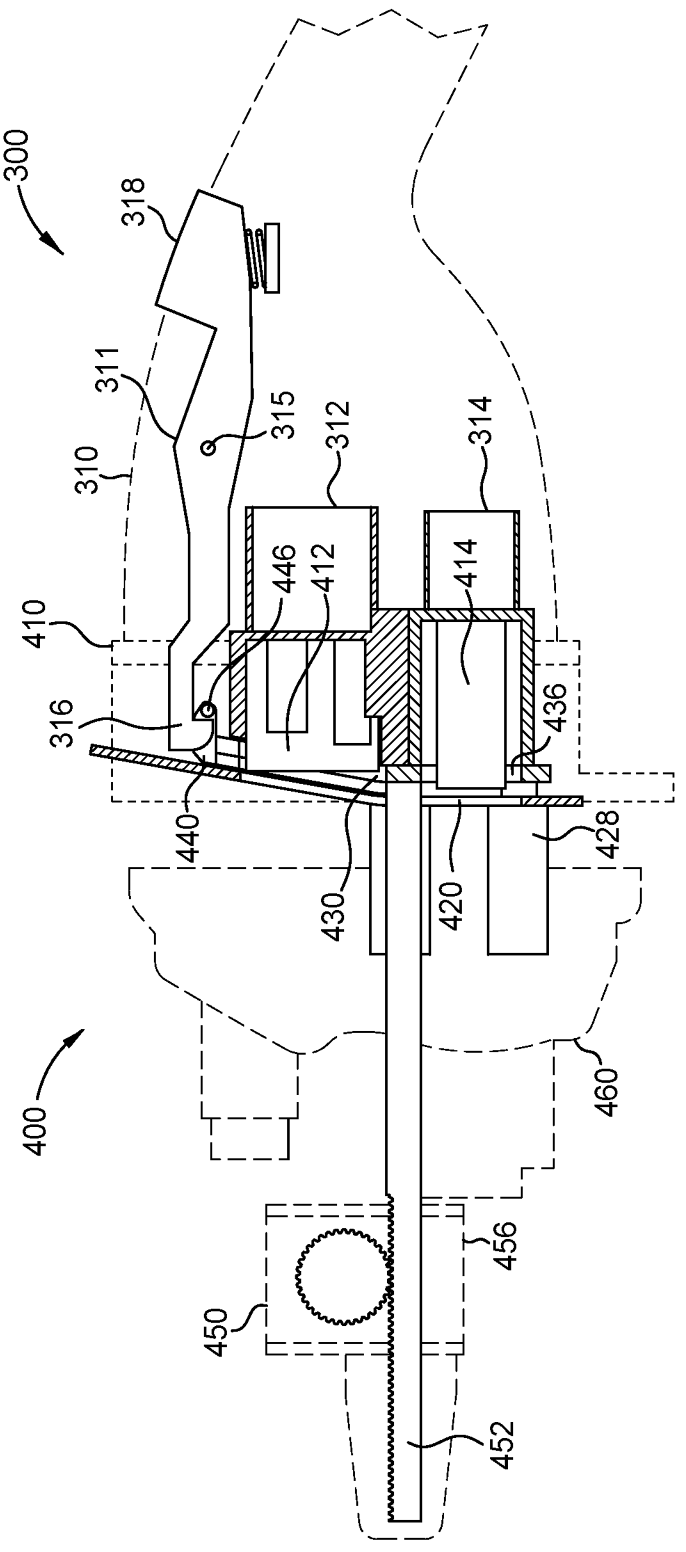
FIG. 8A depicts a longitudinal cross-sectional view of a charging connector and the example charging port depicted in FIG. 4A in the first configuration, in accordance with embodiments of the present disclosure.

FIG. 8A depicts a longitudinal cross-sectional view of charging connector 300 and charging port 400 in the first configuration, in accordance with embodiments of the present disclosure.

With respect to charging connector 300, the following components are identified: connector housing 310, latch arm 311, plug 312, plug 314, latch pivot pin 315, latch 316, latch release button 318 and handle 320. Latch 316 is disposed at the distal end of latch arm 311, and latch release button 318 is disposed at the proximal end of latch arm 311. Latch arm 311 pivots about latch pivot pin 315, and may be spring-loaded to maintain latch 316 in the proper orientation with respect to locking surface 446 of latch interface 440.

With respect to charging port 400, the following components are identified: frame 410, base plate 420 with linear bushing 428, release plate 430 with guide shaft 436, latch interface 440 with locking surface 446, push rod actuator 450, push rod 452, worm gear 456 and housing 460.

Charging connector 300 is coupled to charging port 400. Latch interface 440 is disposed in the latch lock position, and push rod 452 and release plate 430 are disposed in the retracted position (i.e., the first configuration of charging port 400).

Figure 8B:
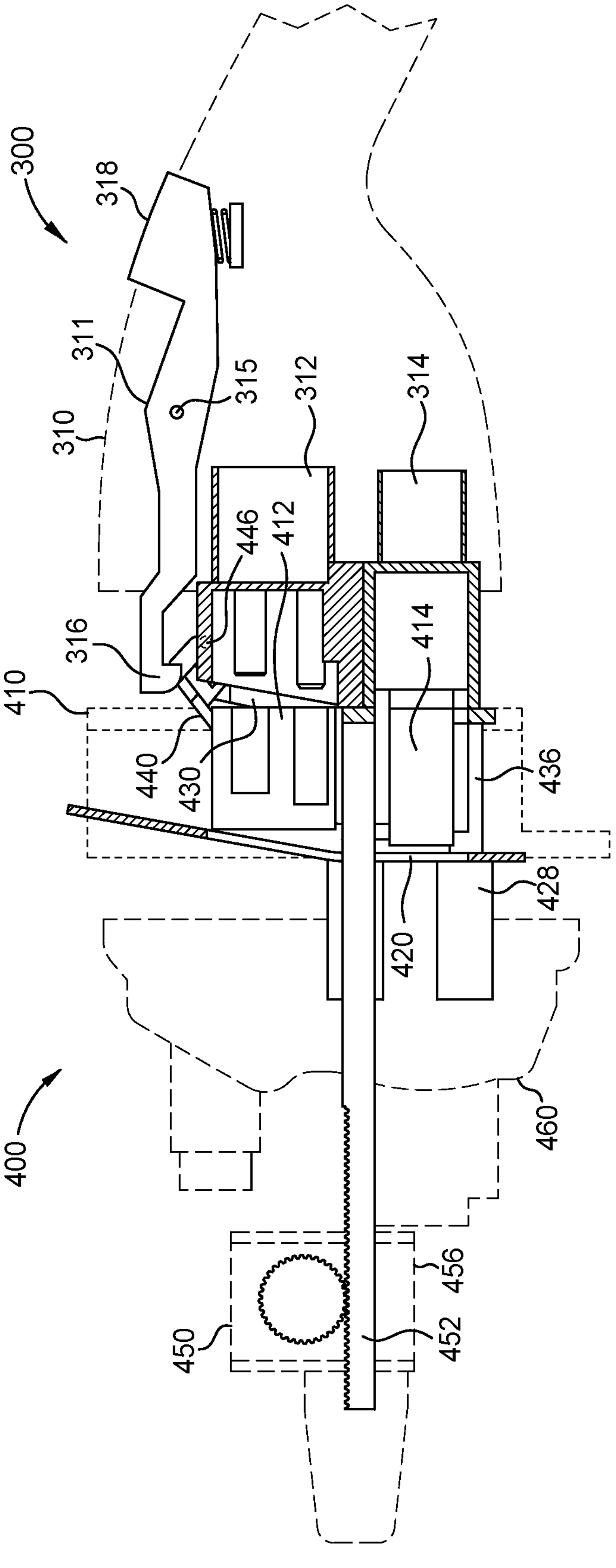
FIG. 8B depicts a longitudinal cross-sectional view of the charging connector and the example charging port depicted in FIG. 4A in the second configuration, in accordance with embodiments of the present disclosure.

FIG. 8B depicts a longitudinal cross-sectional view of charging connector 300 and charging port 400 in the second configuration, in accordance with embodiments of the present disclosure.

Latch interface 440 is disposed in the latch release position, and push rod 452 and release plate 430 are disposed in the extended position (i.e., the second configuration of charging port 400). In this view, charging connector 300 has not yet fallen away from charging port 400.

Figure 8C:
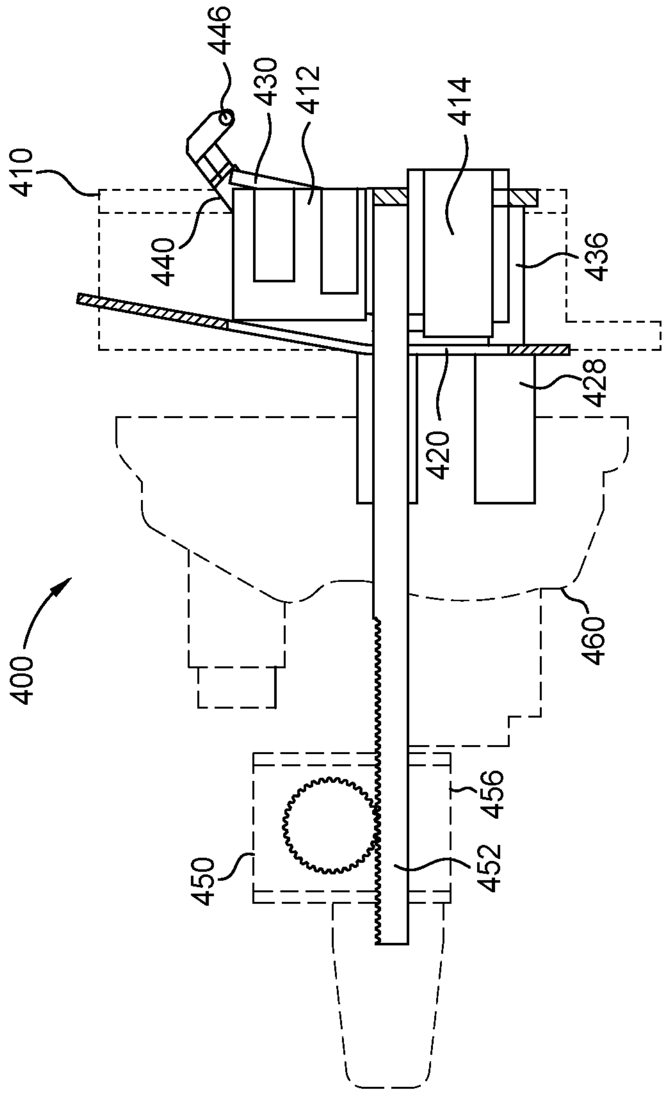
FIG. 8C depicts a longitudinal cross-sectional view of the example charging port depicted in FIG. 4A in the second configuration, in accordance with embodiments of the present disclosure.

FIG. 8C depicts a longitudinal cross-sectional view of charging port 400 in the second configuration, in accordance with embodiments of the present disclosure.

With respect to charging port 400, the following additional components are identified: connector socket 412, connector socket 414, and hinge(s) 441, locking surface 446, cam surface(s) 448 and leg(s) 449 of latch interface 440.

Latch interface 440 is disposed in the latch release position, and push rod 452 and release plate 430 are disposed in the extended position (i.e., the second configuration of charging port 400). In this view, charging connector 300 has fallen away from charging port 400.

Figure 8D:
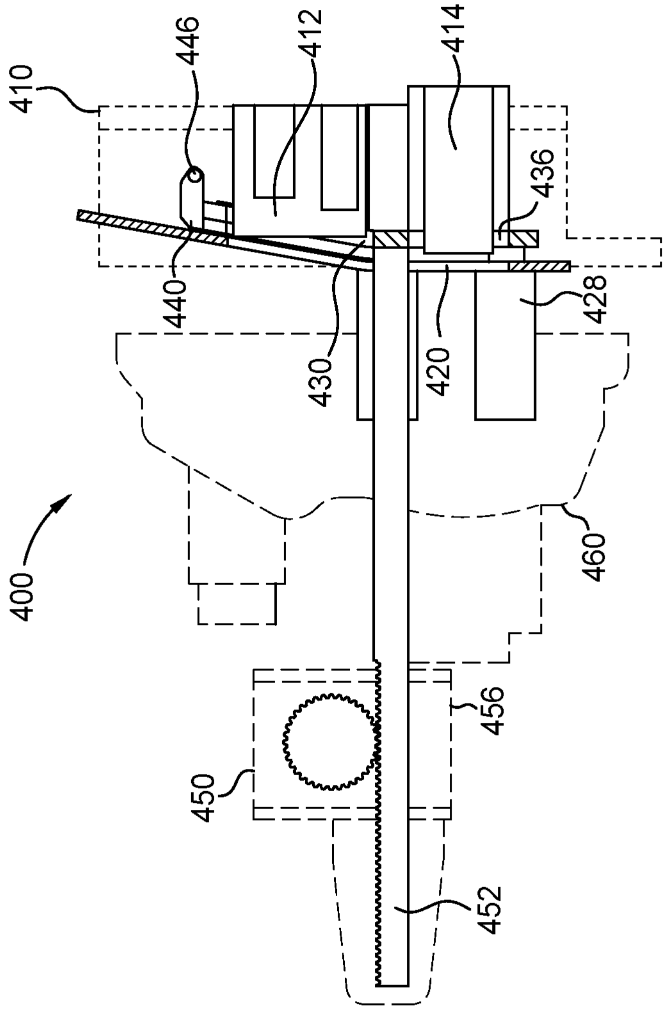
FIG. 8D depicts a longitudinal cross-sectional view of the example charging port depicted in FIG. 4A in the first configuration, in accordance with embodiments of the present disclosure.

FIG. 8D depicts a longitudinal cross-sectional view of charging port 400 in the first configuration, in accordance with embodiments of the present disclosure.

Latch interface 440 is disposed in the latch lock position, and push rod 452 and release plate 430 are disposed in the retracted position (i.e., the first configuration of charging port 400). In this view, charging connector 300 has fallen away from charging port 400.

Figure 8E:
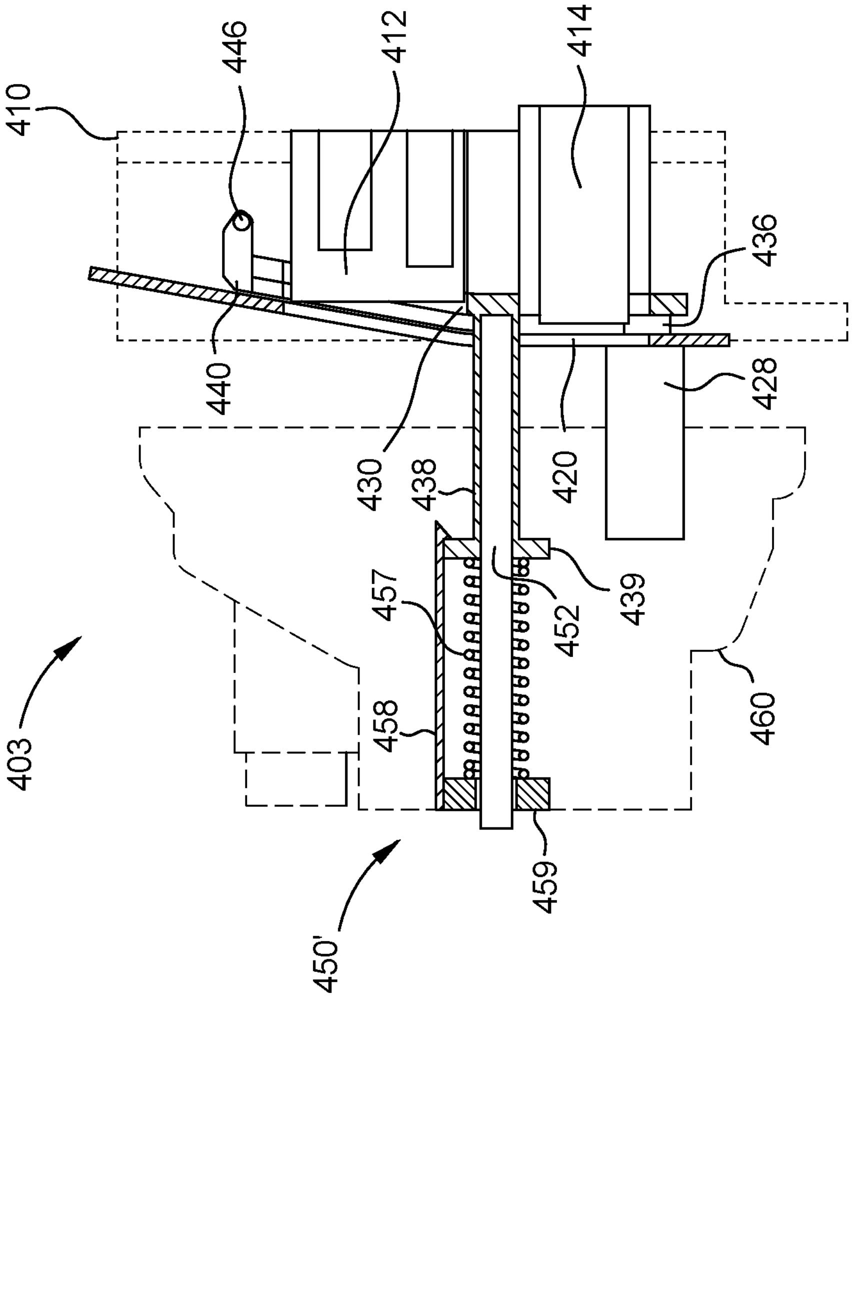
FIG. 8E depicts a longitudinal cross-sectional view of another example charging port of the electric vehicle in a first configuration, in accordance with embodiments of the present disclosure.

FIG. 8E depicts a longitudinal cross-sectional view of charging port 403 in a first configuration, in accordance with embodiments of the present disclosure.

Charging port 403 comprises frame 410, charging socket 412, charging socket 414, base plate 420 with linear bushing 428, release plate 430 with guide shaft 436, extension 438 and flange 439, latch interface 440 with locking surface 446, push rod actuator 450' with spring 457, SMA locking lever 458 and base 459, push rod 452, and housing 460. While charging port 403 incorporates push rod actuator 450', which is different than push rod actuator 450 of charging port 400, as well as an additional extension 438 and flange 439 to accommodate push rod actuator 450', the functionality of the remaining common components is essentially the same as charging port 400.

As shown in FIG. 8E, latch interface 440 is disposed in the latch lock position, push rod 452 and release plate 430 are disposed in the retracted position, and push rod actuator 450' is disposed in the reset position (i.e., the first configuration of charging port 403). In the reset position, SMA locking lever 458 is engaged to flange 439, and spring 458 is compressed between base 459 and flange 439. When charging port 403 is disposed in the first configuration, charging connector 300 may be coupled to charging port 403.

Figure 8F:
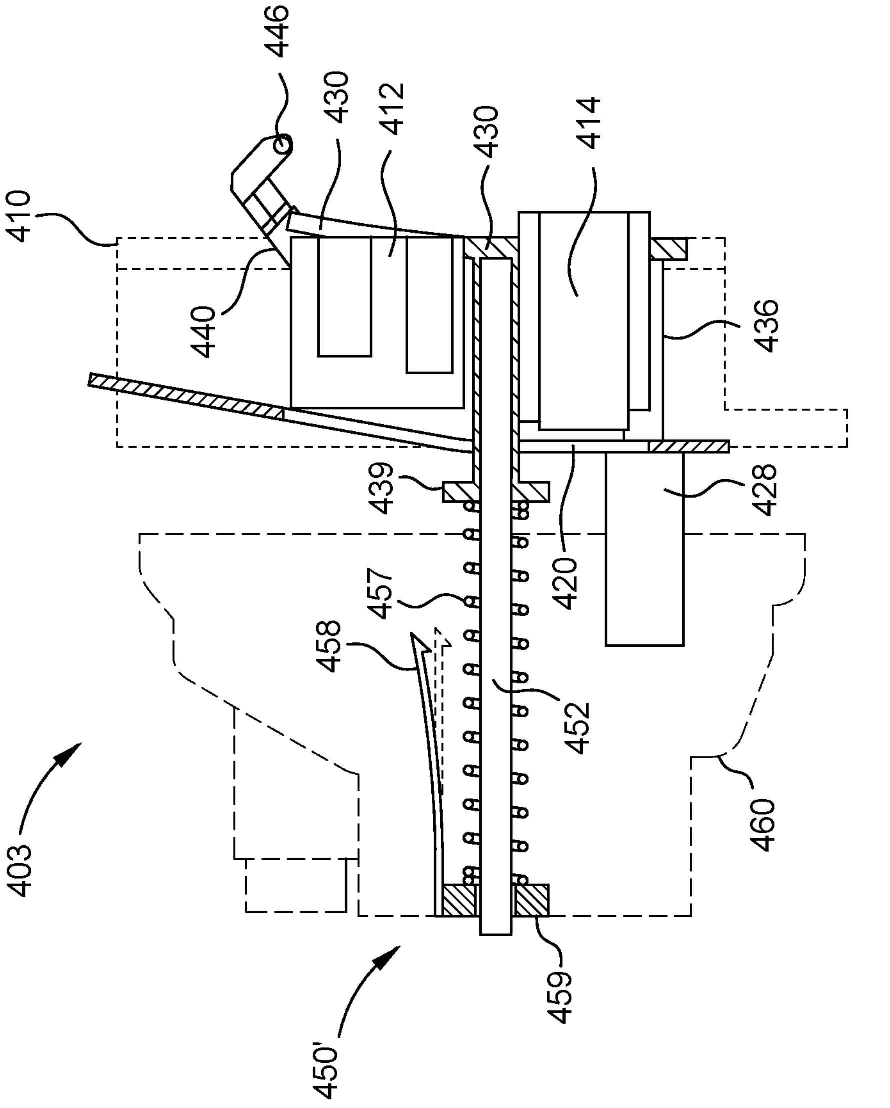
FIG. 8F depicts a longitudinal cross-sectional view of the example charging port of the electric vehicle in a second configuration, in accordance with embodiments of the present disclosure.

FIG. 8F depicts a longitudinal cross-sectional view of charging port 403 in a second configuration, in accordance with embodiments of the present disclosure.

Locking lever 458 is coupled to a heat source, a current source, etc. When push rod actuator 450' is actuated, the heat source (current source, etc.) causes locking lever 458 to transition from a lock position (i.e., the deformed shape of locking lever 458 depicted in dashed outline in FIG. 8F) to an unlock position (i.e., the original shape of locking lever 458 depicted in FIG. 8F). Removing the heat source (current source, etc.), causes locking lever 458 to transition from the unlock position (i.e., the original shape) back to the lock position (i.e., the deformed shape).

In response to a trigger event (discussed below), push rod actuator 450' is activated, locking lever 458 deforms to the original shape thereby releasing release plate 430, and spring 457 begins displacing push rod 452 and release plate 430, along the displacement axis, from the retracted position towards the extended position. When release plate 430 begins displacing, latch interface 440 begins rotating clockwise (i.e., towards charging connector 300), about the rotation axis, due to the bias torque provided by the springs of hinges 441, and release plate 430 begins uncoupling (i.e., pushing) plug 312 from connector socket 412 and uncoupling (i.e., pushing) plug 314 from connector socket 414. Guide shafts 436 and linear bushings 428 prevent release plate 430 from excessive displacement under the influence of spring 457, and charging connector 300 then falls away from charging port 403.

As shown in FIG. 8F, latch interface 440 is disposed in the latch release position, push rod 452 and release plate 430 are disposed in the extended position, and push rod actuator 450' is disposed in the actuated position (i.e., the second configuration of charging port 403). In the actuated position, SMA locking lever 458 is disengaged from flange 439, and spring 458 is expanded between base 459 and flange 438. When charging port 403 is disposed in the second configuration, charging connector 300 may be uncoupled from charging port 403 under the influence of gravity or another force, as discussed above.

After a first time period (such as 10 seconds, etc.), the heat source (current source, etc.) is removed, causing locking lever 458 to begin transitioning from the unlock position (i.e., the original shape) back to the lock position (i.e., the deformed shape). After a second time period (such as 30 seconds, etc.), locking lever 458 has transitioned back to the lock position (i.e., the deformed shape), and push rod actuator 450' may be returned to the reset position.

After driving to a safe location, a person located outside electric vehicle 100 may simply push release plate 430 back into charging port 403 to reset push rod actuator 450', to return latch interface 440 to the latch lock position, and to return push rod 452 and release plate 430 to the retracted position.

In certain embodiments, the inner surface of charging port cover 114 includes a cam surface that engages release plate 430 when the charging port cover 114 is actuated from the open position to the closed position. The cam surface forces release plate 430 back into charging port 403 to reset push rod actuator 450', to return latch interface 440 to the latch lock position, and to return push rod 452 and release plate 430 to the retracted position.

Figure 9A:
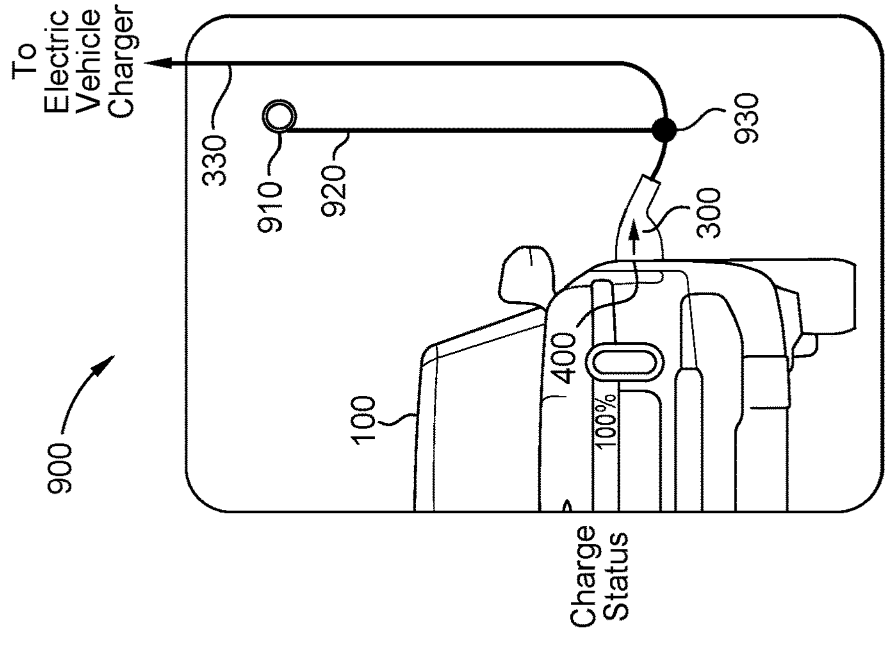
FIGS. 9A, 9B and 9C depict the example electric vehicle in an example charging station, in accordance with embodiments of the present disclosure.
Figure 9B:
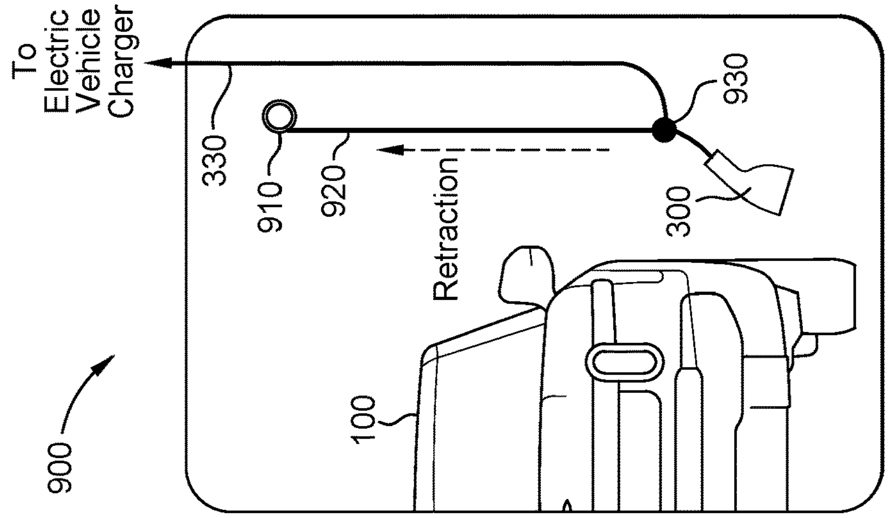
Figure 9C:
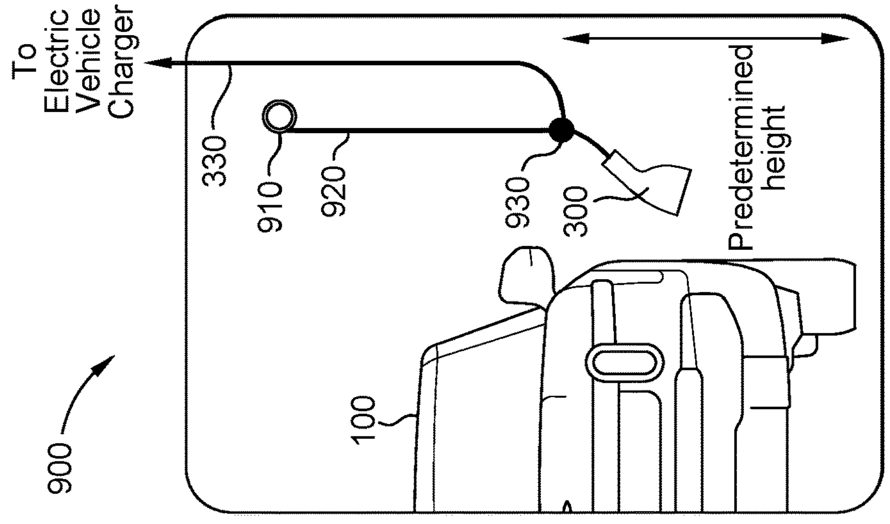

FIGS. 9A, 9B and 9C depict electric vehicle 100 in charging station 900 during the decoupling of charging connector 300 from charging port 400, in accordance with embodiments of the present disclosure.

FIG. 9A depicts the position of charging connector 300 during the transition between the first configuration and the second configuration of charging port 400. Charging connector 300 is supported by charging port 400, while electric vehicle charging cable 330 is supported by tensioning device 910 and support cable 920. Electric vehicle charging cable 330 is attached to support cable 920 using support connector 930. Tensioning device 910 may be, for example, a spring loaded cable reel, a motorized cable reel, etc.

FIG. 9B depicts the position of charging connector 300 after the second configuration of charging port 400 has been attained. Charging connector 300 has been decoupled from charging port 400 and is supported by tensioning device 910 and support cable 920. Tensioning device 910 then begins retracting support cable 920 upwards. In certain embodiments, tensioning device 910 may begin the retraction of support cable 920 based on data provided by one or more sensors, such as a weight sensor (e.g., strain gauge), an optical sensor, etc.

FIG. 9C depicts charging connector 300 at the conclusion of the retraction of support cable 920. Charging connector 300 is supported by tensioning device 910 and support cable 920, and support connector 930 is located at a predetermined height above the ground.

Figure 10:
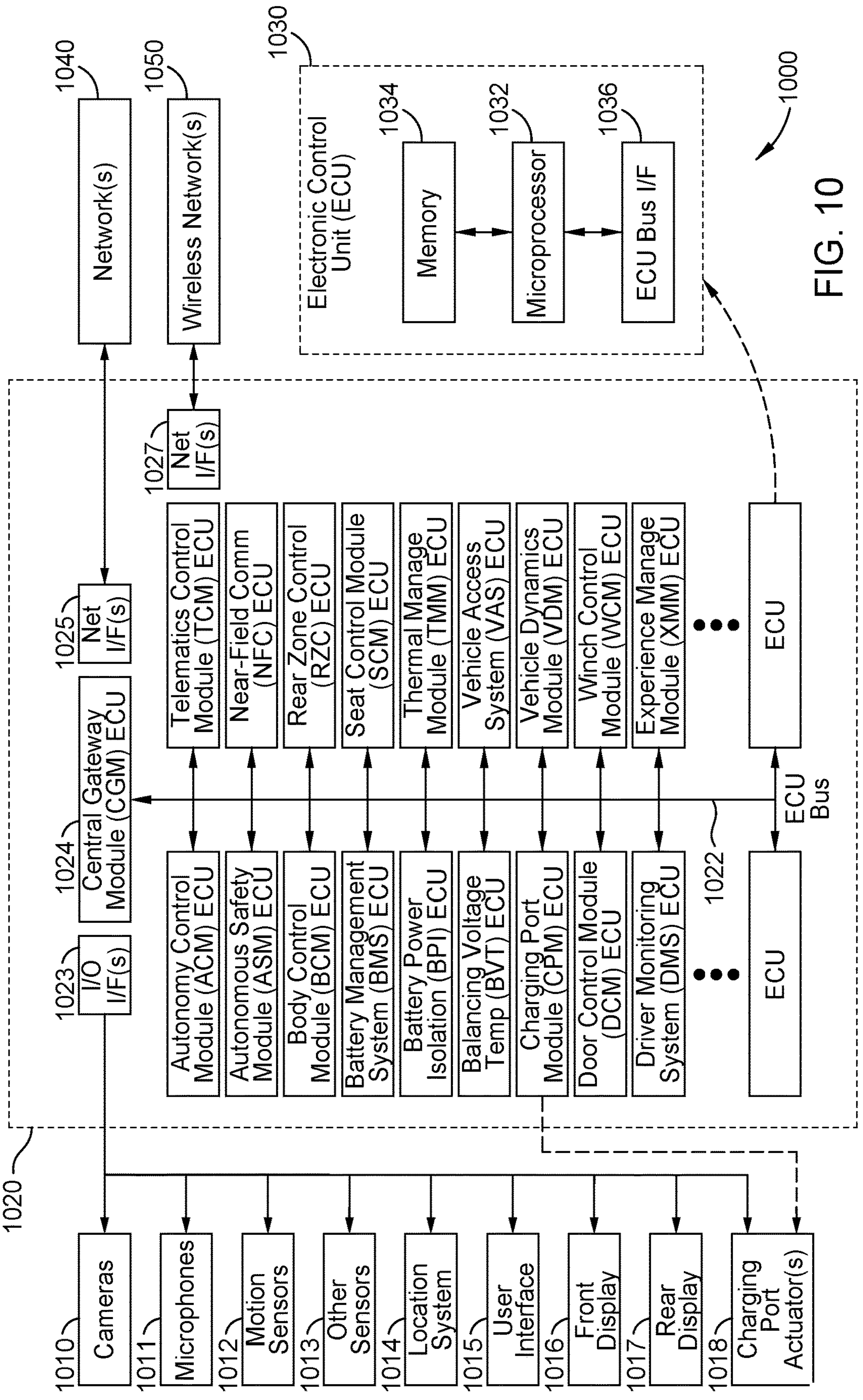
FIG. 10 presents a block diagram of example components of the example electric vehicle, in accordance with embodiments of the present disclosure.

FIG. 10 presents a block diagram 1000 of example components of electric vehicle 100, in accordance with embodiments of the present disclosure.

Generally, electric vehicle 100 includes control system 1020 that is configured to perform the functions necessary to operate electric vehicle 100. In many embodiments, control system 1020 includes a number of electronic control units (ECUs) 1030 coupled to ECU Bus 1022. Each ECU 1030 performs a particular set of functions, and includes, inter alia, microprocessor 1032 coupled to memory 1034 and ECU Bus I/F 1036. In certain embodiments, control system 1020 may include one or more system-on-chips (SOCs). Each SOC may include a number of multi-core processors coupled to a high-speed interconnect and on-chip memory, and may perform a much larger set of functions that a single ECU 1030.

Control system 1020 is coupled to sensors, input/output (I/O) devices and actuators, as well as other components within the propulsion system, the energy storage system, and the accessory system. The sensors may include, for example, cameras 1010, microphones 1011, motion sensors 1012, other sensors 1013, location system 1014, etc. The I/O devices may include, for example, user interface 1015, front display 1016, rear display 1017, etc. The actuators may include, for example, charging port actuator 1018, etc. Additionally, control system 1020 may be coupled to network(s) 1040, network(s) 1050, etc.

In certain embodiments, one or more ECUs 1030 may include the necessary interfaces to be coupled directly to particular sensors, I/O devices, actuators and other vehicle system components. For example, charging port module (CPM) ECU 1028 may be directly connected to charging port actuator 1018 (e.g., push rod actuator 150, the heat or current source for SMA locking surface 476, etc.), as indicated by the dashed line in FIG. 10.

In many embodiments, control system 1020 includes Central Gateway Module (CGM) ECU 1024 which provides a central communications hub for electric vehicle 100. CGM ECU 1024 includes (or is coupled to) I/O interfaces 1023 to receive data, send commands, etc., to and from the sensors, I/O devices, actuators and other vehicle system components. CGM ECU 1024 also includes (or is coupled to) network interface(s) 1025 that provides network connectivity through Controller Area Network (CAN) ports, Local Interconnect Network (LIN) ports, Ethernet ports, etc.

For example, CGM ECU 1024 may receive data from cameras 1010, microphones 1011, motion sensor 1012, other sensors 1013 and location system 1014, as well as user interface 1015, and then communicate the data over ECU Bus 1022 to the appropriate ECU 1030. Similarly, CGM ECU 1024 may receive commands and data from the ECUs 1030 and send them to the appropriate I/O devices, actuators and vehicle components. For example, a GUI widget may be sent to user interface 1015 (e.g., a touchscreen front display 1016 and/or rear display 1017), video data from cameras 1010 may be sent to front display 1016 and rear display 1017, etc. Additionally, CGM ECU 1024 may also serve as a master control over the different vehicle modes (e.g., road driving mode, parked mode, off-roading mode, tow mode, camping mode), and thereby control certain vehicle components related to placing the vehicle in one of the vehicle modes.

In many embodiments, control system 1020 includes Telematics Control Module (TCM) ECU 1026 which provides a vehicle communication gateway for electric vehicle 100. TCM ECU 1026 includes (or is coupled to) network interface(s) 1027 that provides network connectivity to support functionality such as over-the-air (OTA) software updates, communication between the vehicle and the internet, communication between the vehicle and a computing device, in-vehicle navigation, vehicle-to-vehicle communication, communication between the vehicle and landscape features (e.g., automated toll road sensors, automated toll gates, power dispensers at charging stations), automated calling functionality, etc.

In many embodiments, control system 1020 also includes, inter alia, Autonomy Control Module (ACM) ECU, Autonomous Safety Module (ASM) ECU, Body Control Module (BCM) ECU, Battery Management System (BMS) ECU, Battery Power Isolation (BPI) ECU, Balancing Voltage Temperature (BVT) ECU, Door Control Module (DCM) ECU, Driver Monitoring System (DMS) ECU, Near-Field Communication (NFC) ECU, Rear Zone Control (RZC) ECU, Seat Control Module (SCM) ECU, Thermal Management Module (TMM) ECU, Vehicle Access System (VAS) ECU, Vehicle Dynamics Module (VDM) ECU, Winch Control Module (WCM) ECU, an Experience Management Module (XMM) ECU, etc. In certain embodiments, the XMM ECU may transmit data to the TCM ECU 1026 via Ethernet. Additionally or alternatively, the XMM ECU may transmit other data (e.g., sound data from microphones 1011, etc.) to the TCM ECU 1026.

In many embodiments, control system 1020 may also include one or more image processing (IP) ECUs that process video data received from cameras 1010, and then send the processed video data to front display 1016, rear display 1017, etc. The IP ECUs may also be configured to execute object detection algorithms to identify objects depicted in the video data and send notifications to the appropriate ECUs 1030, such as the presence of a person proximate to the car, the presence of fire, the presence of other threats, etc. Control system 1020 may also include one or more audio processing (AP) ECUs that process audio data received from microphones 1011, send the processed audio data to speakers, convert the processed audio data to text and send the text or notifications to the appropriate ECUs 1030, etc. Control system 1020 may also include one or more environmental processing (EP) ECUs that process environmental sensor data received from other sensors 1013 (e.g., external temperature sensors, etc.), and send notifications to the appropriate ECUs 1030, etc.

In many embodiments, CPM ECU 1028 may include object detection algorithms, audio detection algorithms, adverse environmental condition detection algorithms, etc.

Figure 11A:
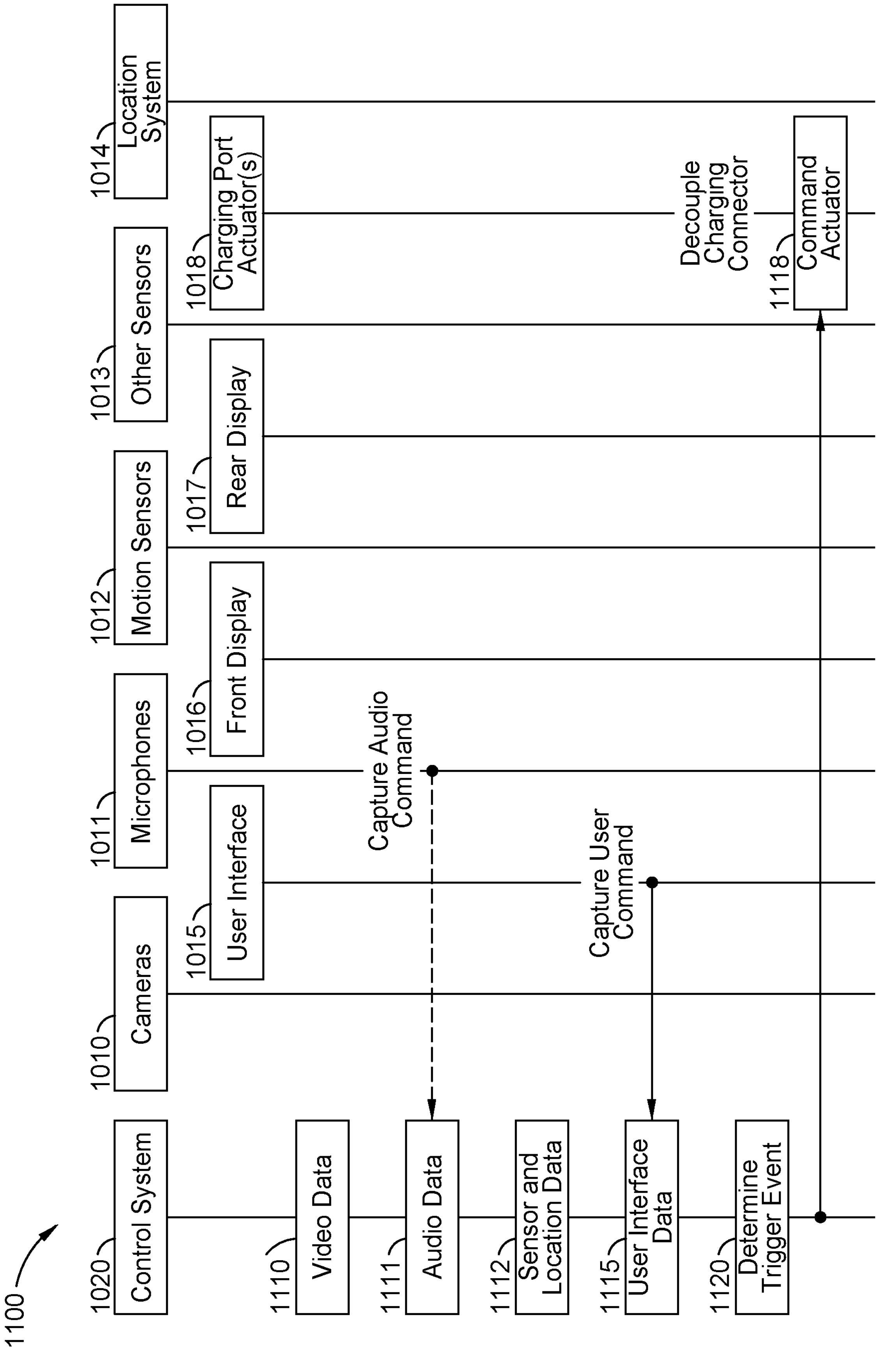
FIGS. 11A and 11B present decouple sequence diagrams, in accordance with embodiments of the present disclosure.
Figure 11B:
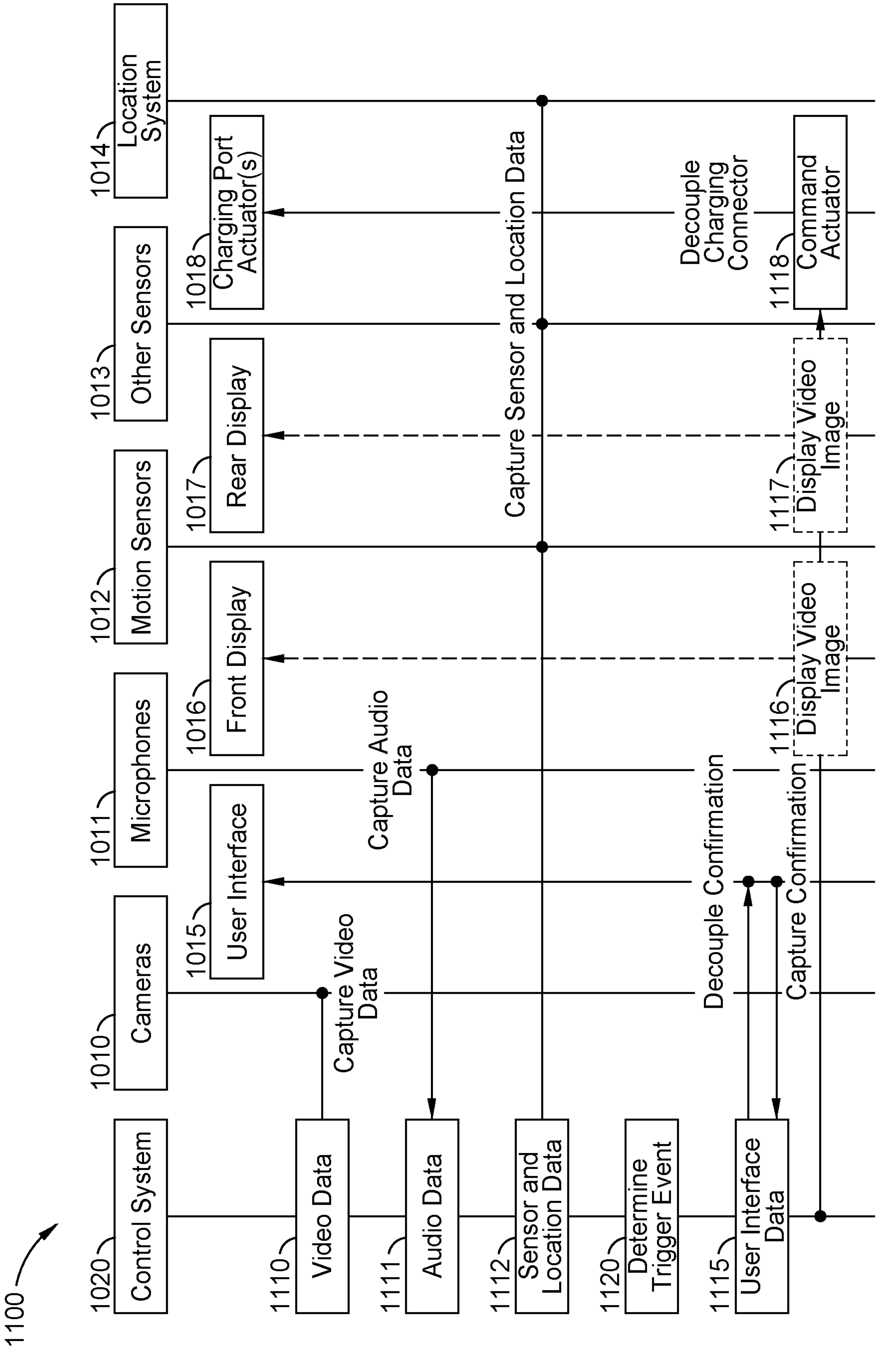

FIGS. 11A and 11B present decouple sequence diagrams 1100 and 1105, respectively, in accordance with embodiments of the present disclosure.

Generally, decouple sequence diagrams 1100 and 1105 depict control system 1020 as well as the sensors, I/O devices, and actuators that may be relevant to decoupling charging connector 300 from charging port 400, including cameras 1010, microphones 1011, motion sensors 1012, other sensors 1013, location system 1014, user interface 1015, front display 1016, rear display 1017, and charging port actuator 1018. Data received by control system 1020 include video data 1110, audio data 1111, sensor and location data 1112 and user interface data 1115, while operations performed by control system 1020 include, inter alia, determining trigger event 1120 and commanding actuator 1118, as well as displaying video images 1116 and 1117.

With respect to decouple sequence diagram 1100, while charging connector 300 is coupled to charging port 400, a decouple request may be initiated by the driver or the passenger through user interface 1015, and provided to control system 1020 as user interface data 1115. One or more of ECUs 1030, such as CPM ECU 1028, processes the user interface data 1115 to determine (1120) that a trigger event has occurred, and then generates and sends a command (1118) to charging port actuator 1018 to decouple charging connector 300 from charging port 400.

Similarly, a decouple request may be initiated by the driver or the passenger through microphones 1011 as an audio command, and provided to control system 1020 as audio data 1111. One or more of ECUs 1030, such as CPM ECU 1028, processes the audio data 1111 to determine (1120) that a trigger event has occurred, and then generates and sends a command (1118) to charging port actuator 1018 to decouple charging connector 300 from charging port 400.

With respect to decouple sequence diagram 1105, while charging connector 300 is coupled to charging port 400, a trigger event may be determined (1120) to have occurred due to one of a number of possible situations.

CPM ECU 1028 may detect a security threat in video data 1110 from cameras 1010 (e.g., person approaching, vehicle approaching, etc.), and then send a decouple confirmation request through user interface 1015. CPM ECU 1028 may detect a security threat in audio data 1111 from microphones 1011 (person yelling outside vehicle, object striking the vehicle, etc.), and then send a decouple confirmation request through user interface 1015. CPM ECU 1028 may detect a security threat in sensor and location data 1112 from motion sensors 1012 (vehicle experiencing undesired motion, such as rocking, etc.), and then send a decouple confirmation request through user interface 1015. CPM ECU 1028 may detect an environmental threat in sensor and location data 1112 from other sensors 1013, such as temperature sensors (external temperature indicates a proximate fire, etc.), etc., and then send a decouple confirmation request through user interface 1015.

Once the decouple request is confirmed by the driver or passenger, CPM ECU 1028 generates and sends a command (1118) to charging port actuator 1018 to decouple charging connector 300 from charging port 400. When the security threat is detected in video data 1110, CPM ECU 1028 may send the video image to front display 1016 for display (1116) and/or to rear display 1017 for display (1117).

Figure 12:
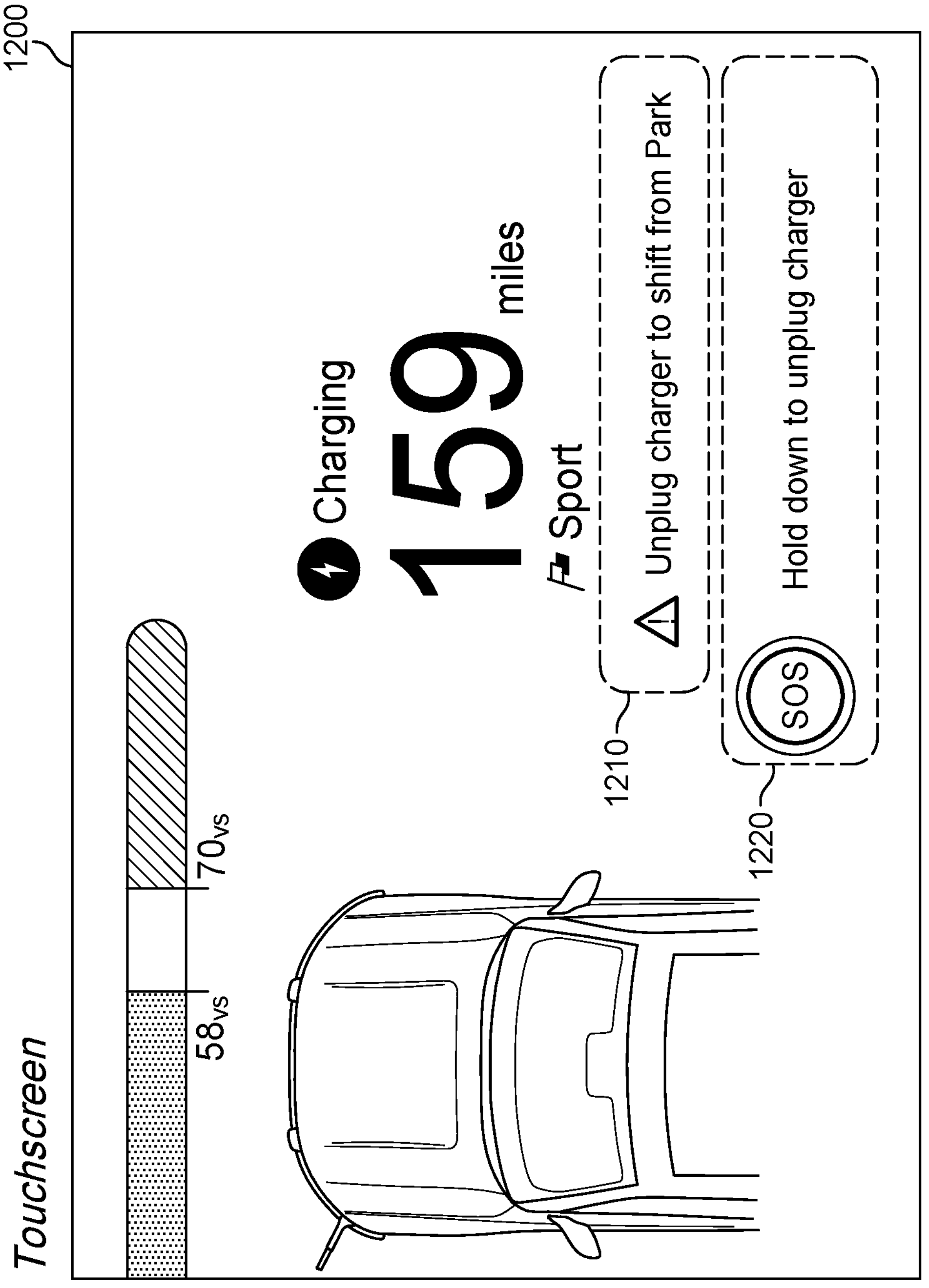
FIG. 12 depicts a user interface for the example electric vehicle, in accordance with embodiments of the present disclosure.

FIG. 12 depicts user interface 1200 for electric vehicle 100, in accordance with embodiments of the present disclosure.

While charging connector 300 is coupled to charging port 400, a trigger event may be determined to have occurred because the driver attempted to shift the transmission from Park to Reverse or Drive. User interface 1200 is a touch-screen display that displays a warning notification 1210 that the charging connecter 300 must be unplugged before the transmission may be shifted from Park. Warning notification 1210 may be generated by one of the ECUs 1030 within control system 1020, such as TCM ECU 1026, CPM ECU 1028, etc. In response, CPM ECU 1028 may generate decouple confirmation request 1220 through user interface 1200. After the driver confirms the decouple confirmation request 1220, such as by pressing on the icon on user interface 1200, CPM ECU 1028 generates and sends a command (1118) to charging port actuator 1018 to decouple charging connector 300 from charging port 400.

Figure 13:
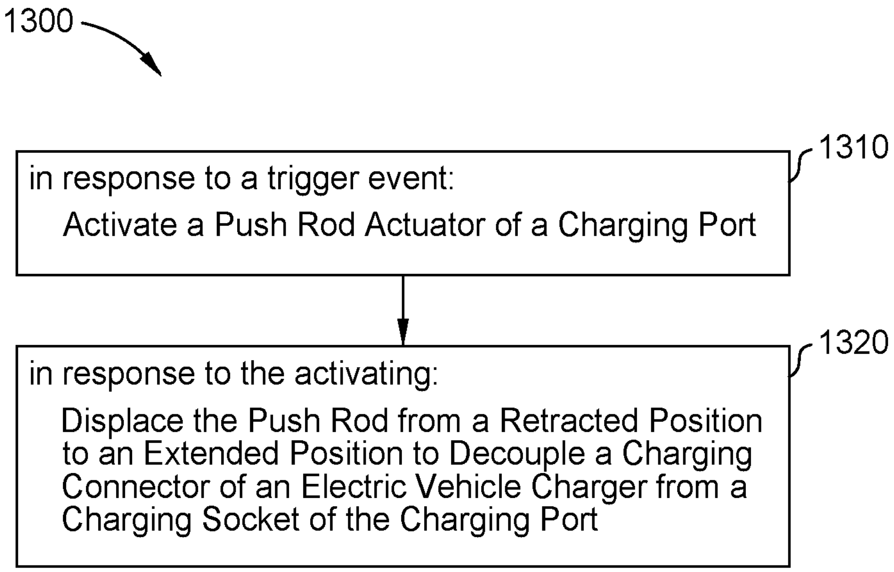
FIG. 13 presents a flowchart of operations performed by the example electric vehicle, in accordance with embodiments of the present disclosure.

FIG. 13 presents a flowchart 1300 of example operations for releasing charging connector 300 of an electric vehicle charger from charging port 400 of electric vehicle 100, in accordance with embodiments of the present disclosure.

At 1210, in response to a trigger event, push rod actuator 150 of charging port 400 or 405 is activated. Operations performed at block 1210 were previously described in detail, such as, in relation to FIGS. 11A and 11B.

At 1220, in response to activating push rod activator 150, push rod 452 is displaced by push rod actuator 150 from a retracted position to an extended position to decouple charging connector 300 from connector socket 412 of charging port 400 or 405. Operations performed at block 1220 were previously described in detail, such as, in relation to FIGS. 11A and 11B.

The many features and advantages of the disclosure are apparent from the detailed specification, and, thus, it is intended by the appended claims to cover all such features and advantages of the disclosure which fall within the scope of the disclosure. Further, since numerous modifications and variations will readily occur to those skilled in the art, it is not desired to limit the disclosure to the exact construction and operation illustrated and described, and, accordingly, all suitable modifications and equivalents may be resorted to that fall within the scope of the disclosure.

What is claimed is:

1. A charging port for an electric vehicle, comprising:
- a connector socket configured to receive a charging connector of an electric vehicle charger;
- a push rod actuator;
- a push rod, coupled to the push rod actuator, the push rod configured to decouple the charging connector from the connector socket when the push rod is displaced from a retracted position to an extended position by the push rod actuator;
- a base plate; and
- a release plate including:
  - a rear surface attached to the push rod, and
  - a front surface configured to contact at least a portion of the charging connector.

2. The charging port of claim 1, wherein the release plate is a displaceable segment of the base plate.

3. The charging port of claim 1, further comprising:
- a latch interface, attached to the base plate, including:
  - a locking surface configured to engage a hook portion of a latch of the charging connector; and
  - a locking surface actuator, coupled to the locking surface, configured to cause the locking surface to transition between a latch lock position and a latch release position.

4. The charging port of claim 3, wherein the locking surface is made from shape memory alloy.

5. The charging port of claim 1, wherein:
- the release plate includes a plurality of guide shafts extending from the rear surface; and
- each of the plurality of guide shafts is supported by a respective linear bushing attached to the base plate.

6. The charging port of claim 5, further comprising:
- a latch interface, rotatably coupled to the release plate, configured to engage a latch of the charging connector.

7. The charging port of claim 6, wherein:
- the latch includes a hook portion and a shoulder portion; and
- the latch interface includes:
  - a locking surface configured to engage the hook portion of the latch, and
  - a cam surface configured to contact the shoulder portion of the latch.

8. The charging port of claim 7, wherein the latch interface is rotatably coupled to the release plate using a pivot pin and a spring.

9. The charging port of claim 8, wherein:
- the hook portion is disposed along a centerline of the latch and the shoulder portion is disposed on either side of the hook portion to form a T-shaped cross-section;
- the latch interface defines a central opening to receive the hook portion of the latch;
- the locking surface is a rod extending through the central opening; and
- the cam surface is disposed on either side of the central opening.

10. The charging port of claim 1, wherein the push rod actuator is a linear actuator.

11. A method for releasing a charging connector of an electric vehicle charger from a charging port of an electric vehicle, the method comprising:
- in response to a trigger event:
  - activating, by a processor, a push rod actuator of the charging port, wherein the push rod actuator is coupled to a push rod, the push rod is coupled to a release plate, the release plate is mounted to a base plate, and the release plate contacts at least a portion of the charging connector; and
- in response to the activating:
  - displacing, by the push rod actuator, the push rod and the release plate from a retracted position to an extended position to decouple the charging connector from a connector socket of the charging port.

12. The method of claim 11, further comprising:
- in response to the trigger event, activating a locking surface actuator to disengage a latch of the charging connector from a locking surface of a latch interface attached to the base plate of the charging port.

13. The method of claim 11, further comprising:
- contacting, by the release plate, at least a portion of the charging connector to decouple the charging connector from the connector socket during the displacing.

14. The method of claim 13, further comprising:
- during the displacing, rotating a latch interface, coupled to the release plate, to disengage a latch of the charging connector from a locking surface of the latch interface.

15. The method of claim 11, wherein the trigger event includes activation of a switch.

16. The method of claim 11, wherein the release plate is a displaceable segment of the base plate.

17. A method for releasing a charging connector of an electric vehicle charger from a charging port of an electric vehicle, the method comprising:

in response to a trigger event:

activating, by a processor, a push rod actuator of the charging port; and in response to the activating:

displacing, by the push rod actuator, a push rod coupled to the push rod actuator from a retracted position to an extended position to decouple the charging connector from a connector socket of the charging port, wherein the trigger event includes selection of an icon displayed in a graphical user interface.

18. The method of claim 17, wherein:

the trigger event includes detection, by the processor, of a predetermined condition; and the selection of the icon confirms the decoupling of the charging connector.

* * * * *